(12) United States Patent
Abi Aoun et al.

(10) Patent No.: US 12,550,932 B2
(45) Date of Patent: Feb. 17, 2026

(54) ARTICLE FOR USE IN A NON-COMBUSTIBLE AEROSOL PROVISION SYSTEM

(71) Applicant: Nicoventures Trading Limited, London (GB)

(72) Inventors: Walid Abi Aoun, London (GB); Joanna Soffe, London (GB); Jennifer Cross, London (GB); Stuart Martin, London (GB)

(73) Assignee: Nicoventures Trading Limited, London (GB)

( * ) Notice: Subject to any disclaimer, the term of this patent is extended or adjusted under 35 U.S.C. 154(b) by 106 days.

(21) Appl. No.: 18/041,650

(22) PCT Filed: Aug. 13, 2021

(86) PCT No.: PCT/GB2021/052107
§ 371 (c)(1),
(2) Date: Feb. 14, 2023

(87) PCT Pub. No.: WO2022/034341
PCT Pub. Date: Feb. 17, 2022

(65) Prior Publication Data
US 2023/0309610 A1    Oct. 5, 2023

(30) Foreign Application Priority Data

Aug. 14, 2020  (GB) ........................ 2012745
Mar. 31, 2021  (GB) ........................ 2104654

(51) Int. Cl.
| | |
|---|---|
| *A24D 1/20* | (2020.01) |
| *A24B 15/14* | (2006.01) |
| *A24B 15/28* | (2006.01) |
| *A24C 5/01* | (2020.01) |
| *A24D 1/00* | (2020.01) |
| *A24D 1/02* | (2006.01) |

(Continued)

(52) U.S. Cl.
CPC ............... *A24D 1/20* (2020.01); *A24B 15/14* (2013.01); *A24B 15/283* (2013.01); *A24C 5/01* (2020.01);
(Continued)

(58) Field of Classification Search
None
See application file for complete search history.

(56) References Cited

U.S. PATENT DOCUMENTS

2016/0295922 A1*  10/2016  John ................. A24F 40/46
2018/0338520 A1*  11/2018  Sutton ............... A24D 1/20

FOREIGN PATENT DOCUMENTS

BR    112013011629 A2    5/2012
EP         3025857 B1    6/2016
(Continued)

OTHER PUBLICATIONS

Invitation to Pay Additional Fees received for PCT Patent Application No. PCT/GB2021/052107, mailed on Nov. 19, 2021, 13 pages.
(Continued)

*Primary Examiner* — Dennis R Cordray
(74) *Attorney, Agent, or Firm* — Merchant & Gould P.C.

(57) ABSTRACT

An article for use in a non-combustible aerosol provision system. A portion of the article includes a first amorphous solid material, and the portion is further surrounded by a layer or sheet of a second amorphous solid material.

23 Claims, 4 Drawing Sheets

(51) Int. Cl.
  *A24D 1/04* (2006.01)
  *A24D 1/18* (2006.01)
  *A24D 3/02* (2006.01)
  *A24D 3/06* (2006.01)

(52) U.S. Cl.
  CPC ............. *A24D 1/002* (2013.01); *A24D 1/025* (2013.01); *A24D 1/04* (2013.01); *A24D 1/18* (2013.01); *A24D 3/0216* (2013.01); *A24D 3/061* (2013.01)

(56) References Cited

FOREIGN PATENT DOCUMENTS

| | | |
|---|---|---|
| JP | 2018512142 A | 5/2018 |
| WO | 2020/025730 A1 | 2/2020 |
| WO | 2020/025735 A1 | 2/2020 |
| WO | 2020/025736 A1 | 2/2020 |
| WO | 2020/025737 A1 | 2/2020 |
| WO | 2020044181 A1 | 3/2020 |

OTHER PUBLICATIONS

International Search Report and Written Opinion received for PCT Patent Application No. PCT/GB2021/052107, mailed on Mar. 18, 2022, 21 pages.
NZ Office Action in New Zealand Application No. 797330, dated Aug. 20, 2024, 6 pages.
Indonesian Patent Application No. P00202300708, Notification of the Results of Substantive Examination, mailed Jun. 5, 2025, 8 pages.

* cited by examiner

ARTICLE FOR USE IN A NON-COMBUSTIBLE AEROSOL PROVISION SYSTEM

PRIORITY CLAIM

The present application is a National Phase entry of PCT Application No. PCT/GB2021/052107, filed Aug. 13, 2021, which claims priority from GB Application No. 2012745.2, filed Aug. 14, 2020 and GB Application No. 2104654.5, filed Mar. 31, 2021, each of which hereby fully incorporated herein by reference.

FIELD

The present disclosure relates to articles for use in non-combustible aerosol provision devices, methods of manufacturing such articles, and systems for providing an aerosol.

BACKGROUND

Smoking articles such as cigarettes, cigars and the like burn tobacco during use to create tobacco smoke. Alternative smoking articles produce an inhalable aerosol or vapor by releasing compounds from a substrate material without burning. These articles may be referred to as non-combustible smoking articles or aerosol provision systems. Such articles commonly include a portion including aerosol generating composition.

SUMMARY

In accordance with embodiments described herein, in a first aspect there is provided an article for use in a non-combustible aerosol provision system, a portion of the article including a first amorphous solid material, said portion being surrounded by a layer or sheet of second amorphous solid material.

In accordance with embodiments described herein, in a second aspect there is provided an article for use in a non-combustible aerosol provision system, a portion of the article including a first amorphous solid material and a second amorphous solid material, wherein one of the first or second amorphous solid materials includes an aerosol former in a higher amount by % weight than the other of the first or second amorphous solid material.

In accordance with embodiments described herein, in a third aspect there is provided an article for use in a non-combustible aerosol provision system, the article including a rod of aerosol generating material including a first amorphous solid material, and a mouthpiece including a capsule including a second amorphous solid material.

In accordance with embodiments described herein, in a fourth aspect there is provided an article for use in a non-combustible aerosol provision system, the article including a mouthpiece and a portion including an aerosol generating material, wherein the aerosol generating material includes a first amorphous solid material and a tobacco material, and the mouthpiece includes a capsule including a second amorphous solid material; wherein the first amorphous solid material, the tobacco material and the capsule each include a flavorant.

In accordance with embodiments described herein, in a fifth aspect there is provided an article for use in a non-combustible aerosol provision system, the article including a mouthpiece and a portion including an aerosol generating material, wherein the mouthpiece includes a capsule including a first amorphous solid material, and the aerosol generating material includes a second amorphous solid material and a tobacco material, wherein the capsule, the second amorphous solid material, and the tobacco material each include a aerosol-former material.

In accordance with embodiments described herein, in a sixth aspect there is provided an article for use in a non-combustible aerosol provision system, the article including a mouthpiece and a portion including an aerosol generating material, wherein the mouthpiece includes a capsule including a first amorphous solid material, and the aerosol generating material includes a second amorphous solid material and a tobacco material, wherein each of the capsule, the second amorphous solid material, and the tobacco material includes a flavorant and an aerosol-former material.

In accordance with embodiments described herein, in a seventh aspect there is provided an article for use in a non-combustible aerosol provision system, the article including a mouthpiece, a heating material, and a portion including an aerosol generating material including tobacco material and an amorphous solid material, wherein the tobacco material and the amorphous solid material include a flavorant or an aerosol-former material.

In accordance with embodiments described herein, in an eighth aspect there is provided an article for use in a non-combustible aerosol provision system, the article including a mouthpiece, and a portion including an aerosol generating material and a heating material, wherein the aerosol generating material includes an amorphous solid material and a tobacco material, and wherein the amorphous solid material includes a flavorant and/or an aerosol-former material, and wherein the tobacco material includes 100% reconstituted tobacco by weight or includes greater than 10% by weight leaf tobacco. In accordance with embodiments described herein, in a ninth aspect there is provided a method for forming an article according to the first or second aspects, the method including:
providing a continuous rod of aerosol generating material, wherein said aerosol generating material includes strands or strips of a first amorphous solid material; and
wrapping said rod with a layer or sheet of a second amorphous solid material.

In accordance with embodiments described herein, in a tenth aspect there is provided a method for forming an article according to the first or second aspects, the method including:
providing a sheet or layer of the first amorphous solid material and a sheet or layer of the second amorphous solid material; and
wrapping the sheet or layer of the first amorphous solid material and the sheet or layer of the second amorphous solid material around a rod of aerosol generating material.

In accordance with embodiments described herein, in an eleventh aspect there is provided a method for forming an article according to the third aspect, the method including the steps of:
providing a continuous rod of aerosol generating material, wherein said aerosol generating material includes strands or strips of a first amorphous solid material; providing a mouthpiece including a capsule including a second amorphous solid material; and
connecting the mouthpiece to the rod of aerosol generating material.

In accordance with embodiments described herein, in an twelfth aspect there is provided a method for forming an article according to the third aspect, the method including the steps of:
providing a sheet or layer of the first amorphous solid material;
wrapping the sheet or layer of the first amorphous solid material around a rod of aerosol generating material;
providing a mouthpiece including a capsule including the second amorphous solid material; and
connecting the wrapped rod of aerosol generating material to the mouthpiece.

In accordance with embodiments described herein, in a thirteenth aspect there is provided a method for forming an article according to the fourth aspect, the method including the steps of:
providing a continuous rod of aerosol generating material, wherein said aerosol generating material includes strands or strips of a first amorphous solid material and a tobacco material including a flavorant;
providing a mouthpiece including a capsule including a second amorphous solid material; and
connecting the mouthpiece to the rod of aerosol generating material.

In accordance with embodiments described herein, in a fourteenth aspect there is provided a method for forming an article according to the fifth aspect, the method including the steps of:
providing a continuous rod of aerosol generating material, wherein said aerosol generating material includes strands or strips of a first amorphous solid material and a tobacco material including an aerosol-former material;
providing a mouthpiece including a capsule including a second amorphous solid material; and
connecting the mouthpiece to the rod of aerosol generating material.

In accordance with embodiments described herein, in a fifteenth aspect there is provided a method for forming an article according to the sixth aspect, the method including the steps of:
providing a continuous rod of aerosol generating material, wherein said aerosol generating material includes strands or strips of a first amorphous solid material and a tobacco material including an aerosol-former material and a flavorant;
providing a mouthpiece including a capsule including a second amorphous solid material; and
connecting the mouthpiece to the rod of aerosol generating material.

In accordance with embodiments described herein, in a sixteenth aspect there is provided a method for forming an article according to the seventh aspect, the method including the steps of:
providing a source of aerosol generating material, wherein said aerosol generating material includes strands or strips of a first amorphous solid material and a tobacco material including an aerosol-former material or a flavorant;
providing a heating material;
forming a continuous rod of aerosol generating material including a heating material.

In accordance with embodiments described herein, in a seventeenth aspect there is provided a method for forming an article according to the eighth aspect, the method including the steps of:
providing a source of aerosol generating material, wherein said aerosol generating material includes strands or strips of a first amorphous solid material and a tobacco material;
providing a heating material;
forming a continuous rod of aerosol generating material including a heating material.

In accordance with embodiments described herein, in a eighteenth aspect there is provided an article for use in a non-combustible aerosol provision system prepared according to the process of any of the ninth to seventeenth aspects above.

In accordance with embodiments described herein, in a nineteenth aspect there is provided a non-combustible aerosol provision system including an aerosol provision device and an article according to any of the first to eighth aspects above.

In accordance with embodiments described herein, in a twentieth aspect there is provided a non-combustible aerosol provision system including an aerosol provision device for generating a varying magnetic field, and an article according to any one of the first to eighth aspects above.

In accordance with embodiments described herein, in a twenty-first aspect there is provided use of an article according to any one of the first to eighth aspects above in a non-combustible aerosol provision device.

BRIEF DESCRIPTION OF THE DRAWINGS

Embodiments of the disclosure will now be described, by way of example only, with reference to accompanying drawings, in which:

FIG. 3b is a is a cross sectional view of the capsule-containing mouthpiece shown in FIG. 3a.

DETAILED DESCRIPTION

Figure 1:
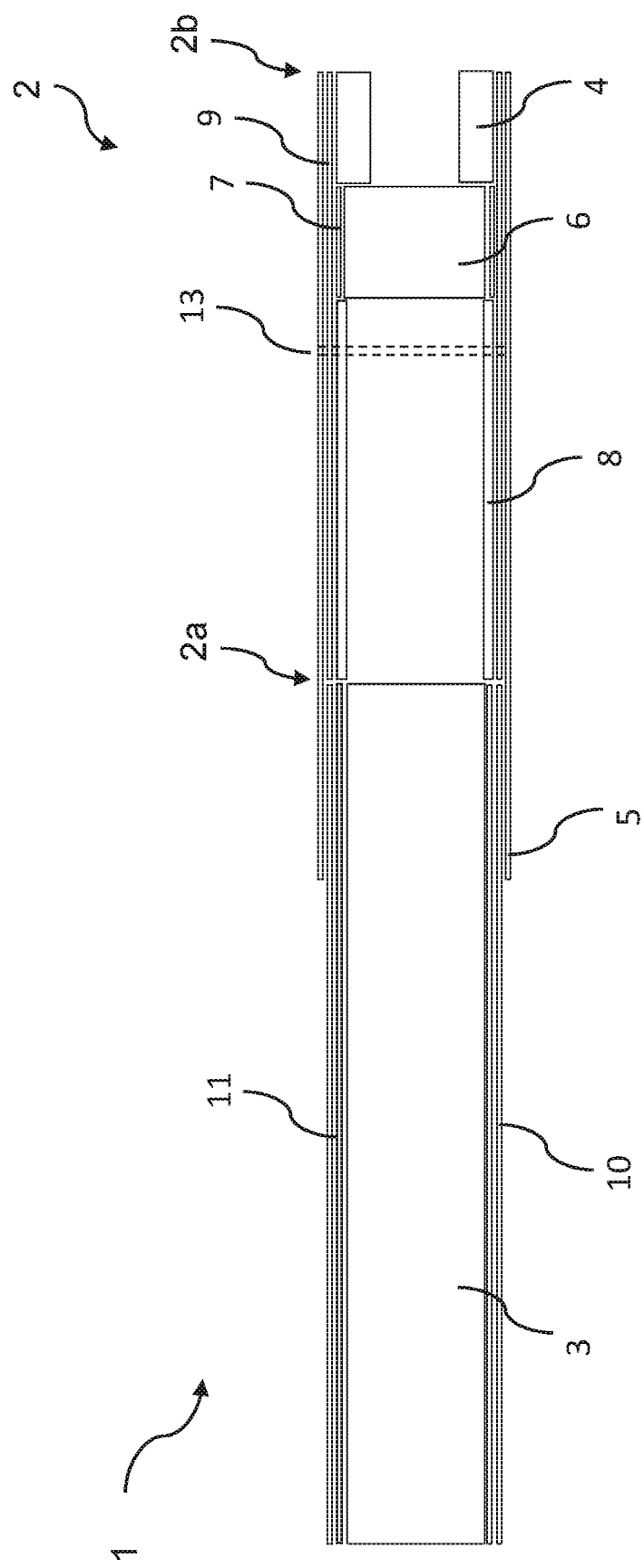
FIG. 1 is a side-on cross sectional view of an article for use with a non-combustible aerosol provision device, the article including a mouthpiece.

As used herein, the term "delivery system" is intended to encompass systems that deliver at least one substance to a user, and includes:
combustible aerosol provision systems, such as cigarettes, cigarillos, cigars, and tobacco for pipes or for roll-your-own or for make-your-own cigarettes (whether based on tobacco, tobacco derivatives, expanded tobacco, reconstituted tobacco, tobacco substitutes or other smokable material);
non-combustible aerosol provision systems that release compounds from an aerosol-generating material without combusting the aerosol-generating material, such as electronic cigarettes, tobacco heating products, and hybrid systems to generate aerosol using a combination of aerosol-generating materials; and
aerosol-free delivery systems that deliver the at least one substance to a user orally, nasally, transdermally or in another way without forming an aerosol, including but not limited to, lozenges, gums, patches, articles including inhalable powders, and oral products such as oral tobacco which includes snus or moist snuff, wherein the at least one substance may or may not include nicotine.

According to the present disclosure, a "combustible" aerosol provision system is one where a constituent aerosol-generating material of the aerosol provision system (or component thereof) is combusted or burned during use in order to facilitate delivery of at least one substance to a user.

In some embodiments, the delivery system is a combustible aerosol provision system, such as a system selected from the group consisting of a cigarette, a cigarillo and a cigar.

In some embodiments, the disclosure relates to a component for use in a combustible aerosol provision system, such as a filter, a filter rod, a filter segment, a tobacco rod, a spill, an aerosol-modifying agent release component such as a capsule, a thread, or a bead, or a paper such as a plug wrap, a tipping paper or a cigarette paper.

According to the present disclosure, a "non-combustible" aerosol provision system is one where a constituent aerosol-generating material of the aerosol provision system (or component thereof) is not combusted or burned in order to facilitate delivery of at least one substance to a user.

In some embodiments, the delivery system is a non-combustible aerosol provision system, such as a powered non-combustible aerosol provision system.

In some embodiments, the non-combustible aerosol provision system is an electronic cigarette, also known as a vaping device or electronic nicotine delivery system (END), although it is noted that the presence of nicotine in the aerosol-generating material is not a requirement.

In some embodiments, the non-combustible aerosol provision system is an aerosol-generating material heating system, also known as a heat-not-burn system. An example of such a system is a tobacco heating system.

In some embodiments, the non-combustible aerosol provision system is a hybrid system to generate aerosol using a combination of aerosol-generating materials, one or a plurality of which may be heated. Each of the aerosol-generating materials may be, for example, in the form of a solid, liquid or gel and may or may not contain nicotine. In some embodiments, the hybrid system includes a liquid or gel aerosol-generating material and a solid aerosol-generating material. The solid aerosol-generating material may include, for example, tobacco or a non-tobacco product.

Typically, the non-combustible aerosol provision system may include a non-combustible aerosol provision device and a consumable for use with the non-combustible aerosol provision device.

In some embodiments, the disclosure relates to consumables including aerosol-generating material and configured to be used with non-combustible aerosol provision devices. These consumables are sometimes referred to as articles throughout the disclosure.

In some embodiments, the non-combustible aerosol provision system, such as a non-combustible aerosol provision device thereof, may include a power source and a controller. The power source may, for example, be an electric power source or an exothermic power source. In some embodiments, the exothermic power source includes a carbon substrate which may be energized so as to distribute power in the form of heat to an aerosol-generating material or to a heat transfer material in proximity to the exothermic power source.

In some embodiments, the non-combustible aerosol provision system may include an area for receiving the consumable, an aerosol generator, an aerosol generation area, a housing, a mouthpiece, a filter and/or an aerosol-modifying agent.

In some embodiments, the consumable for use with the non-combustible aerosol provision device may include aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

In some embodiments, the substance to be delivered may be an aerosol-generating material or a material that is not intended to be aerosolized. As appropriate, either material may include one or more active constituents, one or more flavors, one or more aerosol-former materials, and/or one or more other functional materials.

In some embodiments, the substance to be delivered includes an active substance.

The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may include for example nicotine, caffeine, taurine, theine, vitamins such as B6 or B12 or C, melatonin, cannabinoids, or constituents, derivatives, or combinations thereof. The active substance may include one or more constituents, derivatives or extracts of tobacco, cannabis or another botanical.

In some embodiments, the active substance includes nicotine. In some embodiments, the active substance includes caffeine, melatonin or vitamin B12.

As noted herein, the active substance may include or be derived from one or more botanicals or constituents, derivatives or extracts thereof. As used herein, the term "botanical" includes any material derived from plants including, but not limited to, extracts, leaves, bark, fibers, stems, roots, seeds, flowers, fruits, pollen, husk, shells or the like. Alternatively, the material may include an active compound naturally existing in a botanical, obtained synthetically. The material may be in the form of liquid, gas, solid, powder, dust, crushed particles, granules, pellets, shreds, strips, sheets, or the like. Example botanicals are tobacco, eucalyptus, star anise, hemp, cocoa, cannabis, fennel, lemongrass, peppermint, spearmint, rooibos, chamomile, flax, ginger, *Ginkgo biloba*, hazel, hibiscus, laurel, licorice (liquorice), matcha, mate, orange skin, papaya, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, curcuma, turmeric, sandalwood, cilantro, bergamot, orange blossom, myrtle, cassis, valerian, pimento, mace, damien, marjoram, olive, lemon balm, lemon basil, chive, carvi, verbena, tarragon, geranium, mulberry, ginseng, theanine, theacrine, maca, ashwagandha, damiana, guarana, chlorophyll, baobab or any combination thereof. The mint may be chosen from the following mint varieties: *Mentha Arventis, Mentha* c.v., *Mentha niliaca, Mentha piperita, Mentha piperita citrata* c.v., *Mentha piperita* c.v, *Mentha spicata crispa, Mentha cardifolia, Memtha longifolia, Mentha suaveolens variegata, Mentha pulegium, Mentha spicata* c.v. and *Mentha suaveolens*

In some embodiments, the active substance includes or is derived from one or more botanicals or constituents, derivatives or extracts thereof and the botanical is tobacco.

In some embodiments, the active substance includes or derived from one or more botanicals or constituents, derivatives or extracts thereof and the botanical is selected from eucalyptus, star anise, cocoa and hemp.

In some embodiments, the active substance includes or derived from one or more botanicals or constituents, derivatives or extracts thereof and the botanical is selected from rooibos and fennel.

In some embodiments, the substance to be delivered includes a flavor.

As used herein, the terms "flavor" and "flavorant" refer to materials which, where local regulations permit, may be used to create a desired taste, aroma or other somatosensorial sensation in a product for adult consumers. They may include naturally occurring flavor materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus *Mentha*, eucalyptus, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas.

In some embodiments, the flavor includes menthol, spearmint and/or peppermint. In some embodiments, the flavor includes flavor components of cucumber, blueberry, citrus fruits and/or redberry. In some embodiments, the flavor includes eugenol. In some embodiments, the flavor includes flavor components extracted from tobacco. In some embodiments, the flavor includes flavor components extracted from cannabis.

In some embodiments, the flavor may include a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

Aerosol-generating material is a material that is capable of generating aerosol, for example when heated, irradiated or energized in any other way. Aerosol-generating material may, for example, be in the form of a solid, liquid or gel which may or may not contain an active substance and/or flavorants. In some embodiments, the aerosol-generating material may include an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it.

In embodiments of the disclosure, the article includes an aerosol generating composition, including an aerosol generating material such as first and second amorphous solid materials and/or tobacco material.

Exemplary compositions for the amorphous solid are described hereinbelow. The inventors have advantageously found that a superior aerosol may be generated from an article including a first amorphous solid material and a second amorphous solid material. The composition and material properties of each of the first and second amorphous solid materials may be selected to result in an improved aerosol when included in an article together. Suitably, the first amorphous solid material may be selected to result in an improvement to a first aspect of the aerosol, and the second amorphous solid material may be selected to result in an improvement to a second aspect of the aerosol, and the combination of the first amorphous solid material and the second amorphous solid material may be selected to benefit from the improvement in both aspects.

In some examples, the amorphous solid includes:
1-60 wt % of a gelling agent;
0.1-50 wt % of an aerosol-former agent; and
0.1-80 wt % of a flavor;
wherein these weights are calculated on a dry weight basis.

In some further embodiments, the amorphous solid includes:
1-50 wt % of a gelling agent;
0.1-50 wt % of an aerosol-former agent; and
30-60 wt % of a flavor;
wherein these weights are calculated on a dry weight basis.

In some further embodiments, the amorphous solid includes:
10-50 wt % of one or more gelling agents, wherein the one or more gelling agents includes an alginate gelling agent;
1-80 wt % of an aerosol-former agent;
0.1-60 wt % of a flavor;
optionally 1-15 wt % of an emulsifier; and
optionally a filler.

In some further embodiments, the amorphous solid includes:
10-50 wt % of one or more gelling agents, wherein the one or more gelling agents includes a cellulosic or alginate gelling agent;
1-80 wt % of an aerosol-former agent;
0.1-60 wt % of a flavor;
1-15 wt % of an emulsifier; and optionally a filler.

In some further embodiments, the amorphous solid includes:
10-50 wt % of one or more gelling agents, wherein the gelling agents include a cellulosic and alginate gelling agent;
1-80 wt % of an aerosol-former agent;
0.1-60 wt % of a flavor;
1-15 wt % of an emulsifier; and
optionally a filler.

In some further embodiments, the amorphous solid includes:
10-50 wt % of one or more gelling agents, wherein one of the gelling agents is an alginate gelling agent;
1-80 wt % of an aerosol-former agent;
0.1-60 wt % menthol;
1-15 wt % guar gum; and
a filler.

In some further embodiments, the amorphous solid includes:
10-50 wt % of one or more gelling agents, wherein one of the gelling agents is a cellulosic gelling agent;
1-80 wt % of an aerosol-former agent;
0.1-60 wt % menthol;
1-15 wt % guar gum; and
a filler.

In some further embodiments, the amorphous solid includes:
10-50 wt % of one or more gelling agents, wherein the one or more gelling agents includes a cellulosic and alginate gelling agent;
1-80 wt % of an aerosol-former agent;
0.1-60 wt % menthol;
1-15 wt % guar gum; and
a filler.

In some further embodiments, the amorphous solid includes:
aerosol-former material in an amount of from about 40 to 80 wt % of the amorphous solid;
gelling agent and optional filler (i.e. in some examples filler is present in the amorphous solid, in other examples filler is not present in the amorphous solid), wherein the amount of gelling agent and filler taken together is from about 10 to 60 wt % of the amorphous solid (i.e. the gelling agent and filler taken together account for about 10 to 60 wt % of the amorphous solid); and
optionally, active substance and/or flavorant in an amount of up to about 20 wt % of the amorphous solid (i.e. the amorphous solid includes ≤20 wt % active substance).

Suitably, a first amorphous solid may include:
1-60 wt % of a gelling agent;
0.1-50 wt % of an aerosol-former agent; and
0.1-80 wt % of a flavor;
wherein these weights are calculated on a dry weight basis; and a second amorphous solid may include:
aerosol-former material in an amount of from about 40 to 80 wt % of the amorphous solid;
gelling agent and optional filler (i.e. in some examples filler is present in the amorphous solid, in other examples filler is not present in the amorphous solid), wherein the amount of gelling agent and filler taken together is from about 10 to 60 wt % of the amorphous solid (i.e. the gelling agent and filler taken together account for about 10 to 60 wt % of the amorphous solid); and
optionally, active substance and/or flavorant in an amount of up to about 20 wt % of the amorphous solid (i.e. the amorphous solid includes ≤20 wt % active substance).

Alternatively, a first amorphous solid may include:
1-50 wt % of a gelling agent;
0.1-50 wt % of an aerosol-former agent; and
30-60 wt % of a flavor;
wherein these weights are calculated on a dry weight basis, and a second amorphous solid may include:
aerosol-former material in an amount of from about 40 to 80 wt % of the amorphous solid;
gelling agent and optional filler (i.e. in some examples filler is present in the amorphous solid, in other examples filler is not present in the amorphous solid), wherein the amount of gelling agent and filler taken together is from about 10 to 60 wt % of the amorphous solid (i.e. the gelling agent and filler taken together account for about 10 to 60 wt % of the amorphous solid); and
optionally, active substance and/or flavorant in an amount of up to about 20 wt % of the amorphous solid (i.e. the amorphous solid includes ≤20 wt % active substance).

Alternatively, a first amorphous solid and a second amorphous solid may have the same composition. In some embodiments, a first amorphous solid and a second amorphous solid may have the same composition, but differ in thickness or density.

The amorphous solid material is formed from a dried gel. The inventors have found that using these component proportions means as the gel sets, flavor compounds are stabilized within the gel matrix allowing a higher flavor loading to be achieved than in non-gel compositions. The flavoring (e.g. menthol) is stabilized at high concentrations and the products have a good shelf life.

In some cases, the amorphous solid may have a thickness of about 0.015 mm to about 1.5 mm. Suitably, the thickness may be in the range of about 0.05 mm, 0.1 mm or 0.15 mm to about 0.5 mm, 0.3 mm or 1 mm. The inventors have found that a material having a thickness of 0.2 mm is particularly suitable in some embodiments. The amorphous solid may include more than one layer, and the thickness described herein refers to the aggregate thickness of those layers.

The inventors have established that if the aerosol-forming amorphous solid is too thick, then heating efficiency is compromised. This adversely affects the power consumption in use. Conversely, if the aerosol-forming amorphous solid is too thin, it is difficult to manufacture and handle; a very thin material is harder to cast and may be fragile, compromising aerosol formation in use.

The inventors have established that the amorphous solid thicknesses stipulated herein optimize the material properties in view of these competing considerations.

The thickness stipulated herein is a mean thickness for the material. In some cases, the amorphous solid thickness may vary by no more than 25%, 20%, 15%, 10%, 5% or 1%.

Suitably, the amorphous solid may include from about 1 wt %, 5 wt %, 10 wt %, 15 wt %, 20 wt %, 25 wt %, 30 wt % or 35 wt % to about 60 wt %, 55 wt %, 50 wt %, 45 wt %, 40 wt % or 35 wt % of a gelling agent (all calculated on a dry weight basis). For example, the amorphous solid may include 1-60%, 5-60 wt %, 20-60%, 25-55 wt %, 30-50 wt %, 35-45 wt %, 5-45 wt %, 10-40 wt % or 20-35 wt % of a gelling agent.

In some embodiments, the gelling agent includes a hydrocolloid. In some embodiments, the gelling agent includes one or more compounds selected from the group including alginates, pectins, starches (and derivatives), celluloses (and derivatives), gums, silica or silicones compounds, clays, polyvinyl alcohol and combinations thereof. For example, in some embodiments, the gelling agent includes one or more of alginates, pectins, hydroxyethyl cellulose, hydroxypropyl cellulose, carboxymethylcellulose, pullulan, xanthan gum guar gum, carrageenan, agarose, acacia gum, fumed silica, PDMS, sodium silicate, kaolin and polyvinyl alcohol. In some cases, the gelling agent includes alginate and/or pectin, and may be combined with a setting agent (such as a calcium source) during formation of the amorphous solid. In some cases, the amorphous solid may include a calcium-crosslinked alginate and/or a calcium-crosslinked pectin. In some cases, the gelling agent includes, consists essentially of or consists of carboxymethyl cellulose. In some cases, the gelling agent includes, consists essentially of or consists of carboxymethyl cellulose and alginate.

In some embodiments, the gelling agent includes alginate, and the alginate is present in the amorphous solid in an amount of from 5-40 wt %, for example 10-30 wt % of the amorphous solid (calculated on a dry weight basis). In some embodiments, alginate is the only gelling agent present in the amorphous solid. In other embodiments, the gelling agent includes alginate and at least one further gelling agent, such as pectin.

In some embodiments, the gelling agent includes carboxymethyl cellulose, and the carboxymethyl cellulose is present in the amorphous solid in an amount from 10-50 wt %, 15-40 wt %, 20-35 wt % or 20-30 wt % of amorphous solid (calculated on a dry weight basis). In some embodiments, carboxymethyl cellulose is the only gelling agent present in the aerosol-generating composition. In other embodiments, the gelling agent includes carboxymethyl cellulose and at least one further non-cellulosic gelling agent, such as alginate.

In some embodiments, the gelling agent includes a cellulosic gelling agent and a non-cellulosic gelling agent. In some embodiments, the weight ratio of cellulosic gelling agent to non-cellulosic gelling agent is from 1:4 to 4:1, 2:3 to 7:3, 2:3 to 3:2 or 1:1 to 3:2. In some embodiments, the weight ratio of cellulosic gelling agent to non-cellulosic gelling agent is >1:1. That is, in some embodiments, the cellulosic gelling agent is present in an amount greater than the amount of non-cellulosic gelling agent. In some embodiments, the weight ratio of cellulosic gelling agent to non-cellulosic gelling agent is about 1:1.

Without wishing to be bound by theory, it is thought that by including one or more cellulosic gelling agents in the amorphous solid, flavorant compounds (for example menthol) are stabilized within the matrix allowing controlled release of flavorant over the course of a smoking session. The flavoring (e.g. menthol) is stabilized at high concentrations and the products have a good shelf life.

In some embodiments the amorphous solid may include gelling agent including carrageenan.

In some examples, alginate is included in the gelling agent in an amount of from about 5 to 40 wt % of the amorphous solid, or 15 to 40 wt %. That is, the amorphous solid includes alginate in an amount of about 5 to 40 wt % by dry weight of the amorphous solid, or 15 to 40 wt %. In some examples, the amorphous solid includes alginate in an amount of from about 20 to 40 wt %, or about 15 wt % to 35 wt % of the amorphous solid.

In some examples, pectin is included in the gelling agent in an amount of from about 3 to 15 wt % of the amorphous solid. That is, the amorphous solid includes pectin in an amount of from about 3 to 15 wt % by dry weight of the amorphous solid. In some examples, the amorphous solid includes pectin in an amount of from about 5 to 10 wt % of the amorphous solid.

In some examples, guar gum is included in the gelling agent in an amount of from about 3 to 40 wt % of the amorphous solid. That is, the amorphous solid includes guar gum in an amount of from about 3 to 40 wt % by dry weight of the amorphous solid. In some examples, the amorphous solid includes guar gum in an amount of from about 5 to 10 wt % of the amorphous solid. In some examples, the amorphous solid includes guar gum in an amount of from about 15 to 40 wt % of the amorphous solid, or from about 20 to 40 wt %, or from about 15 to 35 wt %.

In some examples, the alginate is present in an amount of at least about 50 wt % of the gelling agent. In examples, the amorphous solid includes alginate and pectin, and the ratio of the alginate to the pectin is from 1:1 to 10:1. The ratio of the alginate to the pectin is typically >1:1, i.e. the alginate is present in an amount greater than the amount of pectin. In examples, the ratio of alginate to pectin is from about 2:1 to 8:1, or about 3:1 to 6:1, or is approximately 4:1.

The amorphous solid may include filler. Taken together, the amorphous solid typically includes gelling agent and filler (if present) in an amount of from about 10 to 60 wt % of the amorphous solid. In examples, the amorphous solid includes filler in an amount of from 1 to 15 wt % of the amorphous solid, such as 5 wt % to 15 wt %, or 8 to 12 wt %. In examples, the amorphous solid includes filler in an amount greater than 1 wt %, 5 wt %, or 8 wt % of the amorphous solid. In examples, the amorphous solid includes filler in an amount less than 40 wt %, 30 wt %, 20 wt %, 15 wt %, 12 wt % 10 wt %, 5 wt %, or 1 wt % of the amorphous solid. In other examples, the amorphous solid does not include filler.

In examples, the amorphous solid includes gelling agent and filler, taken together, in an amount of from about 10 wt %, 20 wt %, 25 wt %, 30 wt %, or 35 wt % to about 60 wt %, 55 wt %, 50 wt %, or 45 wt % of the amorphous solid. In examples, the amorphous solid includes gelling agent and filler, taken together, in an amount of from about 20 to 60 wt %, 25 to 55 wt %, 30 to 50 wt %, or 35 to 45 wt % of the amorphous solid.

The filler, if present, may include one or more inorganic filler materials, such as calcium carbonate, perlite, vermiculite, diatomaceous earth, colloidal silica, magnesium oxide, magnesium sulphate, magnesium carbonate, and suitable inorganic sorbents, such as molecular sieves. The filler may include one or more organic filler materials such as wood pulp, cellulose and cellulose derivatives. In particular cases, the amorphous solid includes no calcium carbonate such as chalk.

In some examples which include filler, the filler may be fibrous. For example, the filler may be a fibrous organic filler material such as wood pulp, hemp fiber, cellulose or cellulose derivatives. Without wishing to be bound by theory, it is believed that including fibrous filler in an amorphous solid may increase the tensile strength of the material. This may be particularly advantageous in examples wherein the amorphous solid is provided as a sheet, such as when an amorphous solid sheet circumscribes a rod of material.

In some embodiments, the amorphous solid includes less than 60 wt % of a filler, such as from 1 wt % to 60 wt %, or 5 wt % to 50 wt %, or 5 wt % to 30 wt %, or 10 wt % to 20 wt %.

In other embodiments, the amorphous solid includes less than 20 wt %, suitably less than 10 wt % or less than 5 wt % of a filler. In some cases, the amorphous solid includes less than 1 wt % of a filler, and in some cases, includes no filler.

The amorphous solid may include about 1 wt %, 3 wt % or 5 wt % to about 7 wt %, 10 wt %, 12 wt % or 15 wt % of emulsifier (all calculated on a dry weight basis). In exemplary embodiments, the amorphous solid includes about 3 wt %, 4 wt % or 5 wt % to about 7 wt %, 8 wt % or 10 wt % of emulsifier. For example, the amorphous solid may include 4-8 wt % or 5-7 wt % of emulsifier.

In some cases, the emulsifier includes one or more compounds selected from agar, xanthan gum, gum Arabic (acacia gum), guar gum, locust bean gum, pectin, carrageenan and lecithin. In some cases, the emulsifier includes, consists essentially of or consists of guar gum. In examples, the amorphous solid does not include tobacco fibers. In particular examples, the amorphous solid does not include fibrous material.

In some embodiments, the aerosol generating composition does not include tobacco fibers. In particular embodiments, the aerosol generating composition does not include fibrous material.

In some embodiments, the aerosol generating article does not include tobacco fibers. In particular embodiments, the aerosol generating article does not include fibrous material.

Suitably, the amorphous solid may include from about 0.1 wt %, 0.5 wt %, 1 wt %, 3 wt %, 5 wt %, 7 wt % or 10% to about 80 wt %, 50 wt %, 45 wt %, 40 wt %, 35 wt %, 30 wt % or 25 wt % of an aerosol former material (all calculated on a dry weight basis). For example, the amorphous solid may include about 40-80 wt %, 40-75 wt %, 50-70 wt %, or 55-65 wt % aerosol former material. The aerosol former material may act as a plasticizer. For example, the amorphous solid may include 0.5-40 wt %, 3-35 wt % or 10-25 wt % of an aerosol former material. In some cases, the aerosol former material includes one or more compound selected from erythritol, propylene glycol, glycerol, triacetin, sorbitol and xylitol. In some cases, the aerosol former material includes, consists essentially of or consists of glycerol. The inventors have established that if the content of the plasticizer is too high, the amorphous solid may absorb water resulting in a material that does not create an appropriate consumption experience in use. The inventors have established that if the plasticizer content is too low, the amorphous solid may be brittle and easily broken. The inventors have found that an article including a suitable amount of aerosol former material may advantageously include a first amorphous solid material including a first amount of aerosol former material, and a second amorphous solid material including a second amount of aerosol former material. The first amount of aerosol former material may be greater than the second amount of aerosol former material. The inventors have advantageously found that such an arrangement allows higher levels of aerosol former material to be provided in the amorphous solid components of the article, without the above described disadvantages associated with high plasticizer content.

The plasticizer content specified herein provides an amorphous solid flexibility which allows the sheet to be wound onto a bobbin, which is useful in manufacture of aerosol generating articles.

The amorphous solid may include a flavor. Suitably, the amorphous solid may include up to about 80 wt %, 70 wt %, 60 wt %, 55 wt %, 50 wt % or 45 wt % of a flavor.

In some cases, the amorphous solid may include at least about 0.1 wt %, 1 wt %, 10 wt %, 20 wt %, 30 wt %, 35 wt % or 40 wt % of a flavor (all calculated on a dry weight basis). For example, the amorphous solid may include 1-80 wt %, 10-80 wt %, 20-70 wt %, 30-60 wt %, 35-55 wt % or 30-45 wt % of a flavor. In some cases, the flavor includes, consists essentially of or consists of menthol.

In some cases, the amorphous solid may additionally include an emulsifying agent, which emulsified molten flavor during manufacture. For example, the amorphous solid may include from about 5 wt % to about 15 wt % of an emulsifying agent (calculated on a dry weight basis), suitably about 10 wt %. The emulsifying agent may include acacia gum.

In some examples, the amorphous solid does not include a flavorant; in particular examples, the amorphous solid does not include an active substance.

In some embodiments, the amorphous solid is a hydrogel and includes less than about 20 wt % of water calculated on a wet weight basis. In some cases, the hydrogel may include less than about 15 wt %, 12 wt % or 10 wt % of water calculated on a wet weight basis. In some cases, the hydrogel may include at least about 1 wt %, 2 wt % or at least about 5 wt % of water (WWB).

In some embodiments, the amorphous solid additionally includes an active substance. For example, in some cases, the amorphous solid additionally includes a tobacco material and/or nicotine. In some cases, the amorphous solid may include 5-60 wt % (calculated on a dry weight basis) of a tobacco material and/or nicotine. In some cases, the amorphous solid may include from about 1 wt %, 5 wt %, 10 wt %, 15 wt %, 20 wt % or 25 wt % to about 70 wt %, 60 wt %, 50 wt %, 45 wt %, 40 wt %, 35 wt %, 30 wt %, 20 wt %, 15 wt %, or 10 wt % (calculated on a dry weight basis) of an active substance. In some cases, the amorphous solid may include from about 1 wt %, 5 wt %, 10 wt %, 15 wt %, 20 wt % or 25 wt % to about 70 wt %, 60 wt %, 50 wt %, 45 wt %, 40 wt %, 35 wt %, or 30 wt % (calculated on a dry weight basis) of a tobacco material. For example, the amorphous solid may include 10-50 wt %, 15-40 wt % or 20-35 wt % of a tobacco material. In some cases, the amorphous solid may include from about 1 wt %, 2 wt %, 3 wt % or 4 wt % to about 20 20 wt %, 18 wt %, 15 wt % or 12 wt % (calculated on a dry weight basis) of nicotine. For example, the amorphous solid may include 1-20 wt %, 2-18 wt % or 3-12 wt % of nicotine.

In some cases, the amorphous solid includes an active substance such as tobacco extract. In some cases, the amorphous solid may include 5-60 wt % (calculated on a dry weight basis) of tobacco extract. In some cases, the amorphous solid may include from about 5 wt %, 10 wt %, 15 wt %, 20 wt % or 25 wt % to about 60 wt %, 50 wt %, 45 wt %, 40 wt %, 35 wt %, or 30 wt % (calculated on a dry weight basis) tobacco extract. For example, the amorphous solid may include 10-50 wt %, 15-40 wt % or 20-35 wt % of tobacco extract. The tobacco extract may contain nicotine at a concentration such that the amorphous solid includes 1 wt % 1.5 wt %, 2 wt % or 2.5 wt % to about 6 wt %, 5 wt %, 4.5 wt % or 4 wt % (calculated on a dry weight basis) of nicotine.

In some cases, there may be no nicotine in the amorphous solid other than that which results from the tobacco extract.

In some embodiments the amorphous solid includes no tobacco material but does include nicotine. In some such cases, the amorphous solid may include from about 1 wt %, 2 wt %, 3 wt % or 4 wt % to about 20 wt %, 18 wt %, 15 wt % or 12 wt % (calculated on a dry weight basis) of nicotine. For example, the amorphous solid may include 1-20 wt %, 2-18 wt % or 3-12 wt % of nicotine.

In some cases, the total content of active substance and/or flavor may be at least about 0.1 wt %, 1 wt %, 5 wt %, 10 wt %, 20 wt %, 25 wt % or 30 wt %. In some cases, the total content of active substance and/or flavor may be less than about 90 wt %, 80 wt %, 70 wt %, 60 wt %, 50 wt % or 40 wt % (all calculated on a dry weight basis).

In some cases, the total content of tobacco material, nicotine and flavor may be at least about 0.1 wt %, 1 wt %, 5 wt %, 10 wt %, 20 wt %, 25 wt % or 30 wt %. In some cases, the total content of active substance and/or flavor may be less than about 90 wt %, 80 wt %, 70 wt %, 60 wt %, 50 wt % or 40 wt % (all calculated on a dry weight basis).

The amorphous solid may be made from a gel, and this gel may additionally include a solvent, included at 0.1-50 wt %. However, the inventors have established that the inclusion of a solvent in which the flavor is soluble may reduce the gel stability and the flavor may crystallize out of the gel. As such, in some cases, the gel does not include a solvent in which the flavor is soluble.

In some examples, the amorphous solid in sheet form may have a tensile strength of from around 150 N/m to around 3000 N/m, for instance from 150 N/m to 2500 N/m, or 150 N/m to 2000 N/m, or 200 N/m to 1700 N/m, or 250 N/m to 1500 N/M. In some examples, such as where the amorphous solid does not include a filler, the amorphous solid may have a tensile strength of from 150 N/m to 500 N/m, or 200 N/m to 300 N/m, or about 250 N/m. Such tensile strengths may be particularly suitable for embodiments wherein the amorphous solid material is formed as a sheet and then shredded and incorporated into an aerosol generating article.

In some examples, such as where the amorphous solid includes a filler, the amorphous solid may have a tensile strength of from 150 N/m to 3000 N/m, for example 500 N/m to 1,200 N/m, or from 700 N/m to 900 N/m, or around 800 N/m or greater. In some examples, the amorphous solid may have a tensile strength of greater than 500 N/m, greater than 1000 N/m or greater than 1500 N/m. Such tensile strengths may be particularly suitable for embodiments wherein the amorphous solid material is included in an aerosol generating article/assembly as a rolled sheet, suitably in the form of a tube.

In some cases, the amorphous solid may consist essentially of, or consist of a gelling agent, water, an aerosol former material, a flavor, and optionally an active substance.

In some cases, the amorphous solid may consist essentially of, or consist of a gelling agent, water, an aerosol former material, a flavor, and optionally a tobacco material and/or a nicotine source.

In some embodiments, the amorphous solid is formed as a sheet.

In embodiments described herein, the amorphous solid material may be incorporated into the article in sheet form. The amorphous solid sheet may be incorporated as a planar sheet, as a gathered or bunched sheet, as a crimped sheet, or as a rolled sheet (i.e. in the form of a tube). In some such cases, the amorphous solid of these embodiments may be included in an aerosol generating article as a sheet, such as a sheet circumscribing a rod of aerosolizable material (e.g. tobacco). For example, the amorphous solid sheet may be formed on a wrapping paper which circumscribes an aerosolizable material such as tobacco. Additionally or alternatively, the amorphous solid material in sheet form may be shredded and then incorporated into the article, suitably mixed into an aerosolizable material such as a tobacco material.

The amorphous solid in sheet form may have any suitable area density, such as from about 30 g/m2 to about 150 g/m2. In some cases, the sheet may have a mass per unit area of about 55 g/m2 to about 135 g/m2, or about 55 g/m2 to about 120 g/m2. In some examples, for instance when the amorphous solid is shredded and mixed with tobacco material, it can have a mass per unit area of about 80 to about 120 g/m2, or from about 70 to about 110 g/m2, or from about 90 to about 110 g/m2. These ranges can provide a density which is similar to the density of cut rag tobacco and as a result a mixture of these substances can be provided which will not readily separate. Such area densities may be particularly suitable where the amorphous solid material is included in an aerosol-generating article as a shredded sheet. In some cases, the sheet may have a mass per unit area of about 30 to 70 g/m2, 40 to 60 g/m2, or 25 to 60 g/m2, for instance when used to wrap an aerosolizable material such as tobacco. In some examples, suitably, the amorphous solid may have an area density of between about 60 g/m2 and about 90 g/m2, for instance about 68 gsm or about 83 gsm.

The amorphous solid may be present on or in a support to form a substrate. The support functions as a support on which the amorphous solid layer forms, easing manufacture. The support may provide rigidity to the amorphous solid layer, easing handling.

The support may be any suitable material which can be used to support an amorphous solid. In some cases, the support may be formed from materials selected from metal foil, such as aluminum foil, paper, carbon paper, greaseproof paper, ceramic, carbon allotropes such as graphite and graphene, plastic, cardboard, wood or combinations thereof. In some cases, the support may include or consist of a tobacco material, such as a sheet of reconstituted tobacco. In some cases, the support may be formed from materials selected from metal foil, paper, cardboard, wood or combinations thereof. In some cases, the support includes paper. In some cases, the support itself be a laminate structure including layers of materials selected from the preceding lists. In some cases, the support may also function as a flavor support. For example, the support may be impregnated with a flavorant or with tobacco extract.

In some cases, the support may be magnetic. This functionality may be used to fasten the support to the assembly in use, or may be used to generate particular amorphous solid shapes. In some cases, the aerosol generating composition may include one or more magnets which can be used to fasten the material to an induction heater in use.

Suitably, the thickness of the support layer may be in the range of about 10 μm, 15 μm, 17 μm, 20 μm, 23 μm, 25 μm, 50 μm, 75 μm or 0.1 mm to about 2.5 mm, 2.0 mm, 1.5 mm, 1.0 mm or 0.5 mm. The support may include more than one layer, and the thickness described herein refers to the aggregate thickness of those layers.

In some cases, the support may be substantially or wholly impermeable to gas and/or aerosol. This prevents aerosol or gas passage through the support layer, thereby controlling the flow and ensuring it is delivered to the user. This can also be used to prevent condensation or other deposition of the gas/aerosol in use on, for example, the surface of a heater provided in an aerosol generating assembly. Thus, consumption efficiency and hygiene can be improved in some cases.

In some cases, the surface of the support that abuts the amorphous solid may be porous. For example, in one case, the support includes paper. The inventors have found that a porous support such as paper is particularly suitable for the present disclosure; the porous (e.g. paper) layer abuts the amorphous solid layer and forms a strong bond. The amorphous solid is formed by drying a gel and, without being limited by theory, it is thought that the slurry from which the gel is formed partially impregnates the porous support (e.g. paper) so that when the gel sets and forms cross-links, the support is partially bound into the gel. This provides a strong binding between the gel and the support (and between the dried gel and the carrier).

Additionally, surface roughness may contribute to the strength of bond between the amorphous material and the support. The inventors have found that the paper roughness (for the surface abutting the support) may suitably be in the range of 50-1000 Bekk seconds, suitably 50-150 Bekk seconds, suitably 100 Bekk seconds (measured over an air pressure interval of 50.66-48.00 kPa). (A Bekk smoothness tester is an instrument used to determine the smoothness of a paper surface, in which air at a specified pressure is leaked between a smooth glass surface and a paper sample, and the time (in seconds) for a fixed volume of air to seep between these surfaces is the "Bekk smoothness".)

Conversely, the surface of the support facing away from the amorphous solid may be arranged in contact with the heater, and a smoother surface may provide more efficient heat transfer. Thus, in some cases, the support is disposed so as to have a rougher side abutting the amorphous material and a smoother side facing away from the amorphous material.

In one particular case, the support may be a paper-backed foil; the paper layer abuts the amorphous solid layer and the properties discussed in the previous paragraphs are afforded by this abutment. The foil backing is substantially impermeable, providing control of the aerosol flow path. A metal foil backing may also serve to conduct heat to the amorphous solid.

In another case, the foil layer of the paper-backed foil abuts the amorphous solid. The foil is substantially impermeable, thereby preventing water provided in the amorphous solid to be absorbed into the paper which could weaken its structural integrity.

In some cases, the support is formed from or includes metal foil, such as aluminum foil. A metallic support may allow for better conduction of thermal energy to the amorphous solid. Additionally, or alternatively, a metal foil may function as a susceptor in an induction heating system. In particular embodiments, the support includes a metal foil layer and a support layer, such as cardboard. In these embodiments, the metal foil layer may have a thickness of less than 20 μm, such as from about 1 μm to about 10 μm, suitably about 5 μm.

In some cases, the support may have a thickness of between about 0.010 mm and about 2.0 mm, suitably from about 0.015 mm, 0.02 mm, 0.05 mm or 0.1 mm to about 1.5 mm, 1.0 mm, or 0.5 mm.

In examples, the aerosol-generating composition includes aerosol generating materials. In examples, the aerosol generating materials include amorphous solid material and tobacco material. The amorphous solid may be provided as a shredded sheet, optionally blended with the tobacco material (e.g. cut tobacco). Alternatively or additionally the amorphous solid may be provided in sheet form, such as a sheet circumscribing a rod of aerosol generating material.

In examples, there is provided an article having a substantially cylindrical shape including aerosol-generating composition which includes amorphous solid as a shredded sheet blended with tobacco material.

Alternatively, or additionally, the aerosol generating composition may include the amorphous solid as a sheet, such as a sheet circumscribing a rod of tobacco material.

In some examples, the article includes a portion including a first amorphous solid material as a shredded sheet blended with tobacco material, and a second amorphous solid material as a sheet circumscribing the portion.

In other examples, the aerosol generating composition includes a portion including tobacco material, and first and second amorphous solid materials wherein each of the first and second amorphous solid materials is provided as a sheet circumscribing the portion including tobacco material.

As used herein, the term "tobacco material" refers to any material including tobacco or derivatives or substitutes thereof. The term "tobacco material" may include one or more of tobacco, tobacco derivatives, expanded tobacco, reconstituted tobacco or tobacco substitutes. The tobacco material may include one or more of ground tobacco, tobacco fiber, cut tobacco, extruded tobacco, tobacco stem, tobacco lamina, reconstituted tobacco and/or tobacco extract.

In the tobacco material described herein, the tobacco material may contain a filler component. The filler component is generally a non-tobacco component, that is, a component that does not include ingredients originating from tobacco. The filler component may be a non-tobacco fiber such as wood fiber or pulp or wheat fiber or other cellulosic substances. The filler component may also be an inorganic material such as chalk, perlite, vermiculite, diatomaceous earth, colloidal silica, magnesium oxide, magnesium sulphate, magnesium carbonate. The filler component may also be a non-tobacco cast material or a non-tobacco extruded material. The filler component may be present in an amount of 0 to 20% by weight of the tobacco material, or in an amount of from 1 to 10% by weight of the composition. In some embodiments, the filler component is absent.

In the tobacco material described herein, the tobacco material contains an aerosol-former material.

In some embodiments, the aerosol-former material of the tobacco material may be glycerol, propylene glycol, or a mixture of glycerol and propylene glycol. Glycerol may be present in an amount of from 10 to 20% by weight of the tobacco material, for example 13 to 16% by weight of the composition, or about 14% or 15% by weight of the composition. Propylene glycol, if present, may be present in an amount of from 0.1 to 0.3% by weight of the composition.

The aerosol-former material may be included in any component, for example any tobacco component, of the tobacco material, and/or in the filler component, if present. Alternatively or additionally the aerosol-former material may be added to the tobacco material separately. In either case, the total amount of the aerosol-former material in the tobacco material can be as defined herein.

The tobacco material can contain between 10% and 90% by weight tobacco leaf, wherein the aerosol-former material is provided in an amount of up to about 10% by weight of the leaf tobacco. To achieve an overall level of aerosol-former material between 10% and 20% by weight of the tobacco material, it has been advantageously found that this can be added in higher weight percentages to the another component of the tobacco material, such as reconstituted tobacco material.

The tobacco material described herein contains nicotine. The nicotine content is from 0.5 to 1.75% by weight of the tobacco material, and may be, for example, from 0.8 to 1.5% by weight of the tobacco material. Additionally or alternatively, the tobacco material contains between 10% and 90% by weight tobacco leaf having a nicotine content of greater than 1.5% by weight of the tobacco leaf. It has been advantageously found that using a tobacco leaf with nicotine content higher than 1.5% in combination with a lower nicotine base material, such as paper reconstituted tobacco, provides a tobacco material with an appropriate nicotine level but better sensory performance than the use of paper reconstituted tobacco alone. The tobacco leaf, for instance cut rag tobacco, can, for instance, have a nicotine content of between 1.5% and 5% by weight of the tobacco leaf.

The tobacco material described herein can contain an aerosol modifying agent, such as any of the flavors described herein. In one embodiment, the tobacco material contains menthol, forming a mentholated article. The tobacco material can include from 3 mg to 20 mg of menthol, for example between 5 mg and 18 mg such as between 8 mg and 16 mg of menthol. In the present example, the tobacco material includes 16 mg of menthol. The tobacco material can contain between 2% and 8% by weight of menthol, for example between 3% and 7% by weight of menthol such as between 4% and 5.5% by weight of menthol. In one embodiment, the tobacco material includes 4.7% by weight of menthol. Such high levels of menthol loading can be achieved using a high percentage of reconstituted tobacco material, for instance greater than 50% of the tobacco material by weight. Alternatively or additionally, the use of a high volume of aerosol-generating material, for instance tobacco material, can increase the level of menthol loading that can be achieved, for instance where greater than about 500 mm$^3$ or suitably more than about 1000 mm$^3$ of aerosol-generating material, such as tobacco material, are used.

In the compositions described herein, where amounts are given in % by weight, for the avoidance of doubt this refers to a dry weight basis, unless specifically indicated to the contrary. Thus, any water that may be present in the tobacco material, or in any component thereof, is entirely disregarded for the purposes of the determination of the weight %. The water content of the tobacco material described herein may vary and may be, for example, from 5 to 15% by weight. The water content of the tobacco material described herein may vary according to, for example, the temperature, pressure and humidity conditions at which the compositions are maintained. The water content can be determined by Karl-Fisher analysis, as known to those skilled in the art. On the other hand, for the avoidance of doubt, even when the aerosol-former material is a component that is in liquid phase, such as glycerol or propylene glycol, any component other than water is included in the weight of the tobacco material. However, when the aerosol-former material is provided in the tobacco component of the tobacco material, or in the filler component (if present) of the tobacco material, instead of or in addition to being added separately to the tobacco material, the aerosol-former material is not included in the weight of the tobacco component or filler component, but is included in the weight of the "aerosol-former material" in the weight % as defined herein. All other ingredients present in the tobacco component are included in the weight of the tobacco component, even if of non-tobacco origin (for example non-tobacco fibers in the case of paper reconstituted tobacco).

In an embodiment, the tobacco material includes the tobacco component as defined herein and the aerosol-former material as defined herein. In an embodiment, the tobacco material consists essentially of the tobacco component as defined herein and the aerosol-former material as defined herein. In an embodiment, the tobacco material consists of the tobacco component as defined herein and the aerosol-former material as defined herein.

Paper reconstituted tobacco may be present in the tobacco component of the tobacco material described herein in an amount of from 10% to 100% by weight of the tobacco component. In embodiments, the paper reconstituted tobacco is present in an amount of from 10% to 80% by weight, or 20% to 70% by weight, of the tobacco component. In a further embodiment, the tobacco component consists essentially of, or consists of, paper reconstituted tobacco. In preferred embodiments, leaf tobacco is present in the tobacco component of the tobacco material in an amount of from at least 10% by weight of the tobacco component. For instance, leaf tobacco can be present in an amount of at least 10% by weight of the tobacco component, while the remainder of the tobacco component includes paper reconstituted tobacco, bandcast reconstituted tobacco, or a combination of bandcast reconstituted tobacco and another form of tobacco such as tobacco granules. Suitably, leaf tobacco can be present in an amount up to 40% or 60% of the tobacco material, while the remainder of the tobacco component includes paper reconstituted tobacco, bandcast reconstituted tobacco, or a combination of bandcast reconstituted tobacco and another form of tobacco such as tobacco granules.

Paper reconstituted tobacco refers to tobacco material formed by a process in which tobacco feedstock is extracted with a solvent to afford an extract of solubles and a residue including fibrous material, and then the extract (usually after concentration, and optionally after further processing) is recombined with fibrous material from the residue (usually after refining of the fibrous material, and optionally with the addition of a portion of non-tobacco fibers) by deposition of the extract onto the fibrous material. The process of recombination resembles the process for making paper.

The paper reconstituted tobacco may be any type of paper reconstituted tobacco that is known in the art. In a particular embodiment, the paper reconstituted tobacco is made from a feedstock including one or more of tobacco strips, tobacco stems, and whole leaf tobacco. In a further embodiment, the paper reconstituted tobacco is made from a feedstock consisting of tobacco strips and/or whole leaf tobacco, and tobacco stems. However, in other embodiments, scraps, fines and winnowings can alternatively or additionally be employed in the feedstock.

The paper reconstituted tobacco for use in the tobacco material described herein may be prepared by methods which are known to those skilled in the art for preparing paper reconstituted tobacco.

In some cases, the tobacco material may be included in the article/assembly in sheet form. In some cases, the tobacco material may be included as a planar sheet. In some cases, the tobacco material may be included as a planar sheet, as a bunched or gathered sheet, as a crimped sheet, or as a rolled sheet (i.e. in the form of a tube). In some cases, the tobacco material may be formed as a sheet and then shredded and incorporated into the article.

The assembly may include an integrated aerosol-generating article and heater, or may include a heater device into which the article is inserted in use.

In examples, the tobacco material includes aerosol former material. Typically, the tobacco material includes tobacco which is fine-cut, and aerosol former material is loaded onto the shreds of tobacco. In examples, the tobacco material includes aerosol former material in an amount of from about 1 to 10 wt % of the tobacco material, such as 3 to 6 wt %.

In examples, the aerosol-generating composition includes aerosol former material in an amount of from about 5 to 30 wt % of the aerosol-generating composition, such as 10 to 20 wt %, or 13 to 18 wt %. In examples the aerosol-generating composition includes aerosol former material in an amount of about 15 wt % of the aerosol-generating composition. This amount includes any aerosol former material present in the aerosol-generating composition, such as aerosol former material provided in the amorphous solid and aerosol former material loaded on to fine cut tobacco.

An aspect of the present disclosure relates to an article for use with a non-combustible aerosol provision system. The article includes the aerosol-generating composition described herein. A consumable is an article, part or all of which is intended to be consumed during use by a user. A consumable may include or consist of aerosol-generating composition. A consumable may include one or more other elements, such as a filter or an aerosol modifying substance. A consumable may include a heating element that emits heat to cause the aerosol-generating composition to generate aerosol in use. The heating element may, for example, include combustible material, or may include a susceptor that is heatable by penetration with a varying magnetic field.

A susceptor is material that is heatable by penetration with a varying magnetic field, such as an alternating magnetic field. The heating material may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The heating material may be both electrically-conductive and magnetic, so that the heating material is heatable by both heating mechanisms.

Induction heating is a process in which an electrically-conductive object is heated by penetrating the object with a varying magnetic field. The process is described by Faraday's law of induction and Ohm's law. An induction heater may include an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating.

In examples, the susceptor is in the form of a closed circuit. It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to include many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Articles of the present disclosure may be provided in any suitable shape. In some examples, the article is provided as a rod (e.g. substantially cylindrical).

An aspect of the disclosure provides non-combustible aerosol provision system including an article according as described herein and non-combustible aerosol provision device including a heater which is configured to heat not burn the aerosol-generating article. A non-combustible aerosol provision system may also be referred to as an aerosol generating assembly. A non-combustible aerosol provision device may be referred to as an aerosol generating apparatus.

In some cases, in use, the heater may heat, without burning, the aerosol-generating composition to a temperature equal to or less than 350° C., such as between 120° C. and 350° C. In some cases, the heater may heat, without burning, the aerosol-generating composition to between 140° C. and 250° C. in use, or between 220° C. and 280° C.

The heater is configured to heat not burn the aerosol-generating article, and thus the aerosol-generating composition. The heater may be, in some cases, a thin film, electrically resistive heater. In other cases, the heater may include an induction heater or the like. The heater may be a combustible heat source or a chemical heat source which undergoes an exothermic reaction to product heat in use. The aerosol generating assembly may include a plurality of heaters. The heater(s) may be powered by a battery.

The aerosol-generating article may additionally include a cooling element and/or a filter. The cooling element, if present, may act or function to cool gaseous or aerosol components. In some cases, it may act to cool gaseous components such that they condense to form an aerosol. It may also act to space the very hot parts of the non-combustible aerosol provision device from the user. The filter, if present, may include any suitable filter known in the art such as a cellulose acetate plug.

In some cases, the aerosol generating assembly may be a heat-not-burn device. That is, it may contain a solid tobacco-containing material (and no liquid aerosol-generating material). In some cases, the amorphous solid may include the tobacco material. A heat-not-burn device is disclosed in WO 2015/062983 A2, which is incorporated by reference in its entirety.

The aerosol-generating article (which may be referred to herein as an article, a cartridge or a consumable) may be adapted for use in a THP, an electronic tobacco hybrid device or another aerosol generating device. In some cases, the article may additionally include a filter and/or cooling element (which have been described above). In some cases, the aerosol-generating article may be circumscribed by a wrapping material such as paper. In particular examples, the article is adapted for use with a tobacco heating product.

The aerosol-generating article may additionally include ventilation apertures. These may be provided in the sidewall of the article. In some cases, the ventilation apertures may be provided in the filter and/or cooling element. These apertures may allow cool air to be drawn into the article during use, which can mix with the heated volatilized components thereby cooling the aerosol.

The ventilation enhances the generation of visible heated volatilized components from the article when it is heated in use. The heated volatilized components are made visible by the process of cooling the heated volatilized components such that supersaturation of the heated volatilized components occurs. The heated volatilized components then undergo droplet formation, otherwise known as nucleation, and eventually the size of the aerosol particles of the heated volatilized components increases by further condensation of the heated volatilized components and by coagulation of newly formed droplets from the heated volatilized components.

In some cases, the ratio of the cool air to the sum of the heated volatilized components and the cool air, known as the ventilation ratio, is at least 15%. A ventilation ratio of 15% enables the heated volatilized components to be made visible by the method described above. The visibility of the heated volatilized components enables the user to identify that the volatilized components have been generated and adds to the sensory experience of the smoking experience.

In another example, the ventilation ratio is between 50% and 85% to provide additional cooling to the heated volatilized components. In some cases, the ventilation ratio may be at least 60% or 65%.

FIG. 1 is a side-on cross sectional view of an article 1 for use in an aerosol delivery system.

The article 1 includes a mouthpiece 2, and a cylindrical rod of aerosol generating material 3, connected to the mouthpiece 2. In embodiments of the disclosure, the aerosol generating composition includes a first amorphous solid material, and a second amorphous solid material. In some embodiments, the aerosol generating composition includes a plurality of strands and/or strips of a tobacco material and a plurality of strips of amorphous solid material. In some embodiments, the aerosol generating composition alternatively or additionally includes at least one sheet of amorphous solid material, for instance, a sheet of amorphous solid material circumscribing a rod of aerosol generating material 3, such as the plurality of strands and/or strips of a tobacco material and the plurality of strips of amorphous solid material.

In the present example, rod of aerosol generating material 3 includes strands and or strips of the first amorphous solid material, which are blended with tobacco material to form the rod of aerosol generating material 3, and the second amorphous solid material 11 is provided in sheet form and forms a wrap, circumscribing the rod of aerosol generating material 3.

In other examples, the rod of aerosol generating material 3 does not include amorphous solid material. Additionally or alternatively, the aerosol generating composition may include a rod of aerosol generating material 3, which may be circumscribed by one or more sheets of amorphous solid material.

In the present example the first amorphous solid material is a dried gel including menthol, and the second amorphous solid material 11 is also a dried gel, including aerosol former in a higher amount by percent weight than the first amorphous solid material. In alternative embodiments, each of the first amorphous solid material and the second amorphous solid material 11 may have any composition as described herein.

The inventors have advantageously found that an improved article may be produced including an aerosol-generating composition including a first component including tobacco material and a second component including amorphous solid, wherein the material properties (e.g. density) and specification (e.g. thickness, length, and cut width) fall within the ranges set out herein. In embodiments of the disclosure, the second component including amorphous solid includes at least two amorphous solid materials. In the present example the first amorphous solid material includes strands and or strips, and is mixed with tobacco material to form a rod of aerosol generating material 3, and the second amorphous solid material 11 is provided as a wrap circumscribing the rod of aerosol generating material 3. In alternative embodiments, both of the first amorphous solid material and the second amorphous solid material 11 may be provided as wraps circumscribing a rod of aerosol generating material 3.

In other examples, the first amorphous solid may be provided as strands and or strips and mixed with tobacco material to form the rod of aerosol generating material 3, and the second amorphous solid material may be provided as a capsule in the mouthpiece.

In some examples, the plurality of strands and/or strips of tobacco material and the plurality of strips of the first amorphous solid material may each have a length of at least about 5 mm. In some embodiments, the material properties and/or dimensions of the at least two components may be suitably selected in other ways, to ensure a relatively uniform mix of the components is possible, and to reduce separation or un-mixing of the components during or after manufacture of the rod of aerosol-generating material 3.

Although described above in rod form, the aerosol-generating composition can be provided in other forms, for instance a plug, pouch, or packet of material within an article. The article can include a consumable for an aerosol delivery system such as a non-combustible aerosol delivery system as described herein. In the present example, the tobacco material for example includes a paper reconstituted tobacco material. The tobacco material can alternatively or additionally include any of the forms described herein. In some embodiments, the tobacco material contains between 10% and 90% by weight tobacco leaf, wherein the aerosol-former material is provided in an amount of up to about 10% by weight of the leaf tobacco, and the remainder of the tobacco material includes paper reconstituted tobacco.

In some cases, the first and second amorphous solid materials may each have a thickness of about 0.015 mm to about 1.0 mm. Suitably, the thickness may be in the range of about 0.05 mm, 0.1 mm or 0.15 mm to about 0.5 mm or 0.3 mm. The inventors have found that a thickness of about 0.09 mm can be particularly suitable for the amorphous solid material where the amorphous solid is provided as shredded amorphous solid material. The inventors have found that a thickness of about 0.1 mm can be particularly suitable for the amorphous solid material 11, where the amorphous solid material is provided as a wrap. The amorphous solid may include more than one layer, and the thickness described herein refers to the aggregate thickness of those layers.

The thickness of the amorphous solid material may be measured using a caliper or a microscope such as a scanning electron microscope (SEM), as known to those skilled in the art, or any other suitable technique known to those skilled in the art.

The inventors have established that if the amorphous solid is too thick, then heating efficiency can be compromised. This can adversely affect power consumption in use, for instance the power consumption for release of flavor from the amorphous solid. Conversely, if the aerosol-forming amorphous solid is too thin, it can be difficult to manufacture and handle; a very thin material can be harder to cast and may be fragile, compromising aerosol formation in use. In some cases, an individual strip or piece of the amorphous solid has a minimum thickness over its area of about 0.05 mm. In some cases, an individual strip or piece of the amorphous solid has a minimum thickness over its area of about 0.08 mm. In some cases, an individual strip or piece of the amorphous solid has a maximum thickness over its area of about 0.25 mm. In some cases, an individual strip or piece of the amorphous solid has a maximum thickness over its area of about 0.2 mm or about 0.15 mm.

The inventors have found that providing amorphous solid material and tobacco material having area density values that differ from each other by less than a given percentage results in less separation in a mixture of these materials, where the amorphous solid material is included in the aerosol generating composition as strands or strips of material. In some examples, the area density of the amorphous solid material may be between 50% and 150% of the area density of the tobacco material. For instance, the area density of the amorphous solid material may be between 60% and 140% of the density of the tobacco material, or between 70% and 110% of the area density of the tobacco material, or between 80% and 120% of the area density of the tobacco material.

For the avoidance of doubt, where reference is made herein to area density, this refers to an average area density calculated for a given strip, piece or sheet of amorphous solid material, the area density calculated by measuring the surface area and weight of the given strip, piece or sheet of amorphous solid material.

In some cases, the amorphous solid thickness may vary by no more than 25%, 20%, 15%, 10%, 5% or 1% across its area.

The amorphous solid in sheet form may have any suitable area density, such as from about 30 g/m² to about 150 g/m². In some cases, the sheet may have a mass per unit area of about 55 g/m² to about 135 g/m², or about 80 to about 120 g/m², or from about 70 to about 110 g/m², or particularly from about 90 to about 110 g/m², or suitably about 68 g/m² or about 83 g/m². These ranges can provide a density which is similar to the density of cut rag tobacco and as a result a mixture of these substances can be provided which will not readily separate. Such area densities may be particularly suitable where the amorphous solid material is included in an aerosol-generating article as a shredded sheet. In some cases, the sheet may have a mass per unit area of about 30 to 90 g/m², 40 to 85 g/m², or 50 to 65 g/m² and may be used to wrap an aerosolizable material such as tobacco.

The density of the tobacco material has an impact on the speed at which heat conducts through the material, with lower densities, for instance those below 700 mg/cc, conducting heat more slowly through the material, and therefore enabling a more sustained release of aerosol.

The tobacco material can include reconstituted tobacco material having a density of less than about 700 mg/cc, for instance paper reconstituted tobacco material. For instance, the aerosol generating material 3 includes reconstituted tobacco material having a density of less than about 600 mg/cc. Alternatively or in addition, the aerosol generating material 3 can include reconstituted tobacco material having a density of at least 350 mg/cc.

The tobacco material may be provided in the form of cut rag tobacco. The cut rag tobacco can have a cut width of at least 15 cuts per inch (about 5.9 cuts per cm, equivalent to a cut width of about 1.7 mm). In some embodiments, the cut rag tobacco has a cut width of at least 18 cuts per inch (about 7.1 cuts per cm, equivalent to a cut width of about 1.4 mm), such as at least 20 cuts per inch (about 7.9 cuts per cm, equivalent to a cut width of about 1.27 mm). In one example, the cut rag tobacco has a cut width of 22 cuts per inch (about 8.7 cuts per cm, equivalent to a cut width of about 1.15 mm) In some embodiments, the cut rag tobacco has a cut width at or below 40 cuts per inch (about 15.7 cuts per cm, equivalent to a cut width of about 0.64 mm) Cut widths between 0.5 mm and 2.0 mm, for instance between 0.6 and 1.7 mm or between 0.6 mm and 1.5 mm, have been found to result in tobacco material which is preferably in terms of surface area to volume ratio, particularly when heated, and the overall density and pressure drop of the rod of aerosol generating material 3. The cut rag tobacco can be formed from a mixture of forms of tobacco material, for instance a mixture of one or more of paper reconstituted tobacco, leaf tobacco, extruded tobacco and bandcast tobacco. In some embodiments the tobacco material includes paper reconstituted tobacco or a mixture of paper reconstituted tobacco and leaf tobacco.

The tobacco material may have any suitable thickness. The tobacco material may have a thickness of at least about 0.145 mm, for instance at least about 0.15 mm, or at least about 0.16 mm. The tobacco material may have a maximum thickness of about 0.25 mm, for instance the thickness of the tobacco material may be less than about 0.22 mm, or less than about 0.2 mm. In some embodiments, the tobacco material may have an average thickness in the range 0.175 mm to 0.195 mm. Such thicknesses may be particularly suitable where the tobacco material is a reconstituted tobacco material.

It can be desirable to provide an aerosol generating composition including a blend of at least two components, such as a first component including tobacco material and a second component including amorphous solid material as described herein. Such aerosol-generating composition can provide an aerosol, in use, with a desirable flavor profile, since additional flavor may be introduced to the aerosol-generating composition by inclusion in the amorphous solid material component. Flavor provided in the amorphous solid material may be more stably retained within the amorphous solid material compared to flavor added directly to the tobacco material, resulting in a more consistent flavor profile between articles produced according to this disclosure.

It can be desirable to include a second amorphous solid material as a further component in the aerosol generating composition, for example as a sheet of amorphous solid material circumscribing a rod including the tobacco material and a first amorphous solid material. The inventors have advantageously found that it is possible to provide an improved aerosol where the article includes first and second amorphous solid materials as described herein, since the composition and material properties of each of the amorphous solid materials may be selected to deliver an improvement in an aspect of the aerosol. For example, the composition of the first amorphous solid material may be selected to achieve a desirable flavor delivery, and the composition of the second amorphous solid material may be selected to achieve a certain aerosol former delivery. In other examples, the second amorphous solid material may be selected to achieve a desirable flavor delivery, and the composition of the first amorphous solid material may be selected to achieve an improved aerosol former delivery. The form in which each of the first and second amorphous solid materials are included in the article (e.g as a shredded sheet or as a wrap) may be selected to achieve volatilization of the components of each of the materials at different stages of the consumption of the article, in use.

The inventors have advantageously found that selecting the form, location and composition of first and second amorphous solids as described herein can result in an improved aerosol. For example, the inventors have found that providing a first amorphous solid surrounding a second amorphous solid allows the location of both amorphous solid materials to be suitably selected for optimization of a certain parameter of the aerosol. For example, providing an amorphous solid material in a high flow region of the article can result in an increased release of flavorant from the amorphous solid material. Similarly, one of the amorphous solid materials may be provided closer to a heat source than the other of the amorphous solid materials, which can result in improved release of aerosol former from the amorphous solid material which is closer to the heater. Suitably, a first amorphous solid material including aerosol former may be provided closer to a heat source than a second amorphous solid material, which can result in an increased release of aerosol former from the first amorphous solid material.

The form in which the amorphous solid material is provided can also impact the rate and amount of release of aerosolizable components of the amorphous solid, such as aerosol former or active substance. For example, providing an amorphous solid in an aerosol generating composition as a shredded sheet can result in aerosol drawn through the article, in use, passing over an increased surface area of the amorphous solid material, compared to amorphous solid material provided as a wrap. Providing an amorphous solid material as a shredded sheet can therefore result in an improved release of flavorant from the amorphous solid material. Where less exposed surface area is desirable, for example to provide a more sustained release of a component of the amorphous solid material, the amorphous solid material may be provided in sheet form as a wrap.

In one exemplary arrangement a first amorphous solid material including aerosol former in a higher amount by percent weight than a second amorphous solid material is provided as a sheet circumscribing a rod of aerosol generating composition, the aerosol generating composition including a second amorphous solid material in shredded sheet form. Both the first amorphous solid material and the second amorphous solid material may include an active substance. The inventors have advantageously found where the first amorphous solid is positioned closer to a heat source, an active substance, for example a flavorant, may be more readily volatilized from the first amorphous solid material, while a more sustained release of active substance may be obtained from the second amorphous solid material which is positioned further from the heat source.

In a further exemplary article, the first amorphous solid material may be provided as a shredded sheet and the second amorphous solid material may be provided as a wrap.

In a further exemplary article the first and second amorphous solid materials may both be provided in sheet form, and circumscribe a rod of aerosol generating composition. A sheet or layer of the first amorphous solid material may overlie a sheet or layer of the second amorphous solid material. In an alternative exemplary article a sheet or layer of the second amorphous solid material may overlie a sheet or layer of the first amorphous solid material.

As described above, tobacco material having a density of at least 350 mg/cc and less than about 700 mg/cc has been advantageously found to result in a more sustained release of aerosol. To provide an aerosol having a consistent flavor profile, it can be desirable for the amorphous solid material component of the aerosol-generating composition to be evenly distributed along the rod. Where one of the first or second amorphous solid materials is included in the aerosol generating composition as a shredded sheet, the inventors have advantageously found that this can be achieved by casting the amorphous solid material to have a thickness as described herein, to provide an amorphous solid material having an area density which is similar to the area density of the tobacco material, and processing the amorphous solid material as described hereinbelow to ensure an even distribution throughout the rod of aerosol generating material 3.

The inventors have advantageously found that sufficiently even mixing of the tobacco material component and the amorphous solid material component can be achieved when the amorphous solid material in sheet form is shredded. In some embodiments the cut width of the shredded amorphous solid material is between 0.75 mm and 2 mm, for instance between 1 mm and 1.5 mm. The strands of amorphous solid material formed by shredding may be cut width-wise, for example in a cross-cut type shredding process, to define a cut length for the shredded amorphous solid material, in addition to a cut width. The cut length of the shredded amorphous solid material is for example at least 2 mm, for instance between 2 mm and 5 mm, at least 2.5 mm, or at least 3 mm. In some examples, the cut length of the shredded amorphous solid material is at least 10 mm, or at least 20 mm. The cut length of the shredded amorphous solid material can be less than 60 mm, less than 50 mm, or less than 40 mm. In some examples, at least 90% of the pieces of shredded amorphous solid material in an article have a cut length of between about 2 mm and about 40 mm, or between about 2 mm and about 25 mm. The inventors have advantageously found that to achieve even mixing of the shredded amorphous solid material with cut rag tobacco, the cut length of the shredded amorphous solid material is in some embodiments non-uniform. Although referred to as cut length, the length of the shreds or strips of amorphous solid material can alternatively or additionally be dictated by a dimension of the material determined during its manufacture, for instance the width of a sheet of the material as manufactured.

In some embodiments, a plurality of strips of amorphous solid is provided and at least one of the plurality of strips of amorphous solid material has a length greater than about 10 mm. At least one of the plurality of strips of amorphous solid material can alternatively or in addition have a length between about 10 mm and about 60 mm, or between about 20 mm and about 50 mm. Each of the plurality of strips of amorphous solid material can have a length between about 10 mm and about 60 mm, or between about 20 mm and about 50 mm.

In some embodiments, the rod of aerosol generating material 3 includes a first component including a tobacco material in an amount from 50% to 98%, for instance from 80% to 95%, wherein the tobacco material is for instance provided as a cut rag tobacco, and a second component including shredded amorphous solid material in an amount from 2% to 50%, for instance from 5% to 20%. For example, the rod of aerosol generating material may include 85% tobacco material and 11% amorphous solid material, by weight. Alternatively, the rod of aerosol generating material may include about 80% tobacco material, and about 20% shredded amorphous solid material.

The aerosol-generating composition can be provided in the form of a rod having a first end and a second end. The portion of the rod between the first end of the rod and a longitudinal position half-way between the first and second ends can include from 20% to 80% of the amorphous solid material in the rod.

In some embodiments the aerosol generating composition is provided as a cylindrical rod of aerosol-generating material. Irrespective of the form of the aerosol-generating composition, it in some embodiments has a length of about 10 mm to 100 mm. In some embodiments, the length of the aerosol-generating composition is preferably in the range about 25 mm to 50 mm, such as in the range about 30 mm to 45 mm, and in specific embodiments about 30 mm to 40 mm.

The volume of aerosol generating material provided can vary from about 200 mm³ to about 4300 mm³, for example from about 500 mm³ to 1500 mm³, such as from about 1000 mm³ to about 1300 mm³. The provision of these volumes of aerosol-generating composition, for instance from about 1000 mm³ to about 1300 mm³, has been advantageously shown to achieve a superior aerosol, having a greater visibility and sensory performance compared to that achieved with volumes selected from the lower end of the range. The mass of aerosol generating composition provided can be greater than 200 mg, for instance from about 200 mg to 400 mg, for example from about 230 mg to 360 mg, such as from about 250 mg to 360 mg. It has been advantageously found that providing a higher mass of aerosol-generating composition results in improved sensory performance compared to aerosol generated from a lower mass of tobacco material.

The mouthpiece 2, in the present example, includes a body of material 6 upstream of the hollow tubular element 4, in this example adjacent to and in an abutting relationship with the hollow tubular element 4. The body of material 6 and hollow tubular element 4 each define a substantially cylindrical overall outer shape and share a common longitudinal axis. The body of material 6 is wrapped in a first plug wrap 7. In some embodiments, the first plug wrap 7 has a basis weight of less than 50 gsm, such as between about 20 gsm and 40 gsm. In some embodiments, the first plug wrap 7 has a thickness of between 30 µm and 60 µm, such as between 35 µm and 45 µm. In some embodiments, the first plug wrap 7 is a non-porous plug wrap, for instance having a permeability of less than 100 Coresta units, for instance less than 50 Coresta units. However, in other embodiments, the first plug wrap 7 can be a porous plug wrap, for instance having a permeability of greater than 200 Coresta Units.

In some embodiments, the length of the body of material 6 is less than about 15 mm. In further embodiments, the length of the body of material 6 is less than about 10 mm. In addition, or as an alternative, the length of the body of material 6 is at least about 5 mm. In some embodiments, the length of the body of material 6 is at least about 6 mm. In some preferred embodiments, the length of the body of material 6 is from about 5 mm to about 15 mm, such as from about 6 mm to about 12 mm, in specific embodiments from about 6 mm to about 12 mm, for example about 6 mm, 7 mm, 8 mm, 9 mm or 10 mm. In the present example, the length of the body of material 6 is 10 mm.

In the present example, the body of material 6 is formed from filamentary tow. In the present example, the tow used in the body of material 6 has a denier per filament (d.p.f.) of 8.4 and a total denier of 21,000. Alternatively, the tow can, for instance, have a denier per filament (d.p.f.) of 9.5 and a total denier of 12,000. In the present example, the tow includes plasticized cellulose acetate tow. The plasticizer used in the tow includes about 7% by weight of the tow. In the present example, the plasticizer is triacetin. In other examples, different materials can be used to form the body of material 6. For instance, rather than tow, the body 6 can be formed from paper, for instance in a similar way to paper filters known for use in cigarettes. Alternatively, the body 6 can be formed from tows other than cellulose acetate, for instance polylactic acid (PLA), other materials described herein for filamentary tow or similar materials. The tow is in some embodiments formed from cellulose acetate. The tow, whether formed from cellulose acetate or other materials, for example has a d.p.f. of at least 5, such as at least 6 and in specific embodiments at least 7. These values of denier per filament provide a tow which has relatively coarse, thick fibers with a lower surface area which result in a lower pressure drop across the mouthpiece 2 than tows having lower d.p.f. values. In some embodiments, to achieve a sufficiently uniform body of material 6, the tow has a denier per filament of no more than 12 d.p.f., for example no more than 11 d.p.f. and in specific embodiments no more than 10 d.p.f.

The total denier of the tow forming the body of material 6 is for example at most 30,000, such as at most 28,000 and in specific embodiments at most 25,000. These values of total denier provide a tow which takes up a reduced proportion of the cross sectional area of the mouthpiece 2 which results in a lower pressure drop across the mouthpiece 2 than tows having higher total denier values. For appropriate firmness of the body of material 6, the tow for example has a total denier of at least 8,000 such as at least 10,000. In some embodiments, the denier per filament is between 5 and 12 while the total denier is between 10,000 and 25,000. In further embodiments, the denier per filament is between 6 and 10 while the total denier is between 11,000 and 22,000. In some embodiments the cross-sectional shape of the filaments of tow are 'Y' shaped, although in other embodiments other shapes such as 'X' shaped filaments can be used, with the same d.p.f. and total denier values as provided herein.

As shown in FIG. 1, the mouthpiece 2 of the article 1 includes an upstream end 3a adjacent to the rod of aerosol generating material 3 and a downstream end 3b distal from the rod of aerosol generating material 3. At the downstream end 3b, the mouthpiece 2 has a hollow tubular element 4 formed from filamentary tow. This has advantageously been found to significantly reduce the temperature of the outer surface of the mouthpiece 2 at the downstream end 3b of the mouthpiece which comes into contact with a consumer's mouth when the article 1 is in use. In addition, the use of the tubular element 4 has also been found to significantly reduce the temperature of the outer surface of the mouthpiece 2 even upstream of the tubular element 4. Without wishing to be bound by theory, it is hypothesized that this is due to the tubular element 4 channeling aerosol closer to the center of the mouthpiece 2, and therefore reducing the transfer of heat from the aerosol to the outer surface of the mouthpiece 2.

In the present example, the article 1 has an outer circumference of about 21 mm (i.e. the article is in the demi-slim format). In other examples, the article can be provided in any of the formats described herein, for instance having an outer circumference of between 15 mm and 25 mm. Since the article is to be heated to release an aerosol, improved heating efficiency can be achieved using articles having lower outer circumferences within this range, for instance circumferences of less than 23 mm. To achieve improved aerosol via heating, while maintaining a suitable product length, article circumferences of greater than 19 mm have also been found to be particularly effective. Articles having circumferences of between 19 mm and 23 mm, such as between 20 mm and 22 mm, have been found to provide a good balance between providing effective aerosol delivery while allowing for efficient heating.

The outer circumference of the mouthpiece 2 is substantially the same as the outer circumference of the rod of aerosol generating material 3, such that there is a smooth transition between these components. In the present example, the outer circumference of the mouthpiece 2 is about 20.8 mm. A tipping paper 5 is wrapped around the full length of the mouthpiece 2 and over part of the rod of aerosol generating material 3 and has an adhesive on its inner surface to connect the mouthpiece 2 and rod 3. In the present example, the tipping paper 5 extends 5 mm over the rod of aerosol generating material 3 but it can alternatively extend between 3 mm and 10 mm over the rod 3, or such as between 4 mm and 6 mm, to provide a secure attachment between the mouthpiece 2 and rod 3. The tipping paper 5 can have a basis weight which is higher than the basis weight of plug wraps used in the article 1, for instance a basis weight of 40 gsm to 80 gsm, such as between 50 gsm and 70 gsm, and in the present example 58 gsm. These ranges of basis weights have been found to result in tipping papers having acceptable tensile strength while being flexible enough to wrap around the article 1 and adhere to itself along a longitudinal lap seam on the paper. The outer circumference of the tipping paper 5, once wrapped around the mouthpiece 2, is about 21 mm.

The "wall thickness" of the hollow tubular element 4 corresponds to the thickness of the wall of the tube 4 in a radial direction. This may be measured, for example, using a caliper. The wall thickness is advantageously greater than 0.9 mm, such as 1.0 mm or greater. In some embodiments, the wall thickness is substantially constant around the entire wall of the hollow tubular element 4. However, where the wall thickness is not substantially constant, the wall thickness is for example greater than 0.9 mm at any point around the hollow tubular element 4, such as 1.0 mm or greater.

In some embodiments, the length of the hollow tubular element 4 is less than about 20 mm. In further embodiments, the length of the hollow tubular element 4 is less than about 15 mm. Still further, the length of the hollow tubular element 4 is less than about 10 mm. In addition, or as an alternative, the length of the hollow tubular element 4 is at least about 5 mm. In some embodiments, the length of the hollow tubular element 4 is at least about 6 mm. In some preferred embodiments, the length of the hollow tubular element 4 is from about 5 mm to about 20 mm, such as from about 6 mm to about 10 mm, in specific embodiments from about 6 mm to about 8 mm, for example about 6 mm, 7 mm or about 8 mm. In the present example, the length of the hollow tubular element 4 is 6 mm.

In some embodiments, the density of the hollow tubular element 4 is at least about 0.25 grams per cubic centimeter (g/cc), such as at least about 0.3 g/cc. In some embodiments, the density of the hollow tubular element 4 is less than about 0.75 grams per cubic centimeter (g/cc), such as less than 0.6 g/cc. In some embodiments, the density of the hollow tubular element 4 is between 0.25 and 0.75 g/cc, such as between 0.3 and 0.6 g/cc, such as between 0.4 g/cc and 0.6 g/cc or about 0.5 g/cc. These densities have been found to provide a good balance between improved firmness afforded by denser material and the lower heat transfer properties of lower density material. For the purposes of the present disclosure, the "density" of the hollow tubular element 4 refers to the density of the filamentary tow forming the element with any plasticizer incorporated. The density may be determined by dividing the total weight of the hollow tubular element 4 by the total volume of the hollow tubular element 4, wherein the total volume can be calculated using appropriate measurements of the hollow tubular element 4 taken, for example, using calipers. Where necessary, the appropriate dimensions may be measured using a microscope.

The filamentary tow forming the hollow tubular element 4 for example has a total denier of less than 45,000, such as less than 42,000. This total denier has been found to allow the formation of a tubular element 4 which is not too dense. In some embodiments, the total denier is at least 20,000, such as at least 25,000. In preferred embodiments, the filamentary tow forming the hollow tubular element 4 has a total denier between 25,000 and 45,000, such as between 35,000 and 45,000. In some embodiments the cross-sectional shape of the filaments of tow are 'Y' shaped, although in other embodiments other shapes such as 'X' shaped filaments can be used.

The filamentary tow forming the hollow tubular element 4 for example has a denier per filament of greater than 3. This denier per filament has been found to allow the formation of a tubular element 4 which is not too dense. In some embodiments, the denier per filament is at least 4, such as at least 5. In preferred embodiments, the filamentary tow forming the hollow tubular element 4 has a denier per filament between 4 and 10, such as between 4 and 9. In one example, the filamentary tow forming the hollow tubular element 4 has an 8Y40,000 tow formed from cellulose acetate and including 18% plasticizer, for instance triacetin.

The hollow tubular element 4 for example has an internal diameter of greater than 3.0 mm. Smaller diameters than this can result in increasing the velocity of aerosol passing though the mouthpiece 2 to the consumer's mouth more than is desirable, such that the aerosol becomes too warm, for instance reaching temperatures greater than 40° C. or greater than 45° C. In some embodiments, the hollow tubular element 4 has an internal diameter of greater than 3.1 mm, for example greater than 3.5 mm or 3.6 mm. In one embodiment, the internal diameter of the hollow tubular element 4 is about 3.9 mm.

The hollow tubular element 4 for example includes from 15% to 22% by weight of plasticizer. For cellulose acetate tow, the plasticizer is in some embodiments triacetin, although other plasticizers such as polyethelyne glycol (PEG) can be used. In some embodiments, the tubular element 4 includes from 16% to 20% by weight of plasticizer, for instance about 17%, about 18% or about 19% plasticizer.

In the present example the hollow tubular element 4 is a first hollow tubular element 4 and the mouthpiece includes a second hollow tubular element 8, also referred to as a cooling element, upstream of the first hollow tubular element 4. In the present example, the second hollow tubular element 8 is upstream of, adjacent to and in an abutting relationship with the body of material 6. The body of material 6 and second hollow tubular element 8 each define a substantially cylindrical overall outer shape and share a common longitudinal axis. The second hollow tubular element 8 is formed from a plurality of layers of paper which are parallel wound, with butted seams, to form the tubular element 8. In the present example, first and second paper layers are provided in a two-ply tube, although in other examples 3, 4 or more paper layers can be used forming 3, 4 or more ply tubes. Other constructions can be used, such as spirally wound layers of paper, cardboard tubes, tubes formed using a papier-mâché type process, molded or extruded plastic tubes or similar. The second hollow tubular element 8 can also be formed using a stiff plug wrap and/or tipping paper as the second plug wrap 9 and/or tipping paper 5 described herein, meaning that a separate tubular element is not required. The stiff plug wrap and/or tipping paper is manufactured to have a rigidity that is sufficient to withstand the axial compressive forces and bending moments that might arise during manufacture and whilst the article 1 is in use. For instance, the stiff plug wrap and/or tipping paper can have a basis weight between 70 gsm and 120 gsm, such as between 80 gsm and 110 gsm. Additionally or alternatively, the stiff plug wrap and/or tipping paper can have a thickness between 80 μm and 200 μm, such as between 100

μm and 160 μm, or from 120 μm to 150 μm. It can be desirable for both the second plug wrap 9 and tipping paper 5 to have values in these ranges, to achieve an acceptable overall level of rigidity for the second hollow tubular element 8.

The second hollow tubular element 8 for example has a wall thickness, which can be measured in the same way as that of the first hollow tubular element 4, of at least about 100 μm and up to about 1.5 mm, for example between 100 μm and 1 mm such as between 150 μm and 500 μm, or about 300 μm. In the present example, the second hollow tubular element 8 has a wall thickness of about 290 μm.

In some embodiments, the length of the second hollow tubular element 8 is less than about 50 mm. In further embodiments, the length of the second hollow tubular element 8 is less than about 40 mm. Still further, the length of the second hollow tubular element 8 is less than about 30 mm. In addition, or as an alternative, the length of the second hollow tubular element 8 is preferably at least about 10 mm. In some embodiments, the length of the second hollow tubular element 8 is at least about 15 mm. In some preferred embodiments, the length of the second hollow tubular element 8 is from about 20 mm to about 30 mm, such as from about 22 mm to about 28 mm, in specific embodiments from about 24 to about 26 mm, for example about 25 mm. In the present example, the length of the second hollow tubular element 8 is 25 mm. The second hollow tubular element 8 is located around and defines an air gap within the mouthpiece 2 which acts as a cooling segment. The air gap provides a chamber through which heated volatilized components generated by the aerosol generating composition flow. The second hollow tubular element 8 is hollow to provide a chamber for aerosol accumulation yet rigid enough to withstand axial compressive forces and bending moments that might arise during manufacture and whilst the article 1 is in use. The second hollow tubular element 8 provides a physical displacement between the aerosol generating composition and the body of material 6. The physical displacement provided by the second hollow tubular element 8 will provide a thermal gradient across the length of the second hollow tubular element 8.

In some embodiments, the mouthpiece 2 includes a cavity having an internal volume greater than 450 mm³. Providing a cavity of at least this volume has been found to enable the formation of an improved aerosol. Such a cavity size provides sufficient space within the mouthpiece 2 to allow heated volatilized components to cool, therefore allowing the exposure of the aerosol generating composition to higher temperatures than would otherwise be possible, since they may result in an aerosol which is too warm. In the present example, the cavity is formed by the second hollow tubular element 8, but in alternative arrangements it could be formed within a different part of the mouthpiece 2. In further embodiments, the mouthpiece 2 includes a cavity, for instance formed within the second hollow tubular element 8, having an internal volume greater than 500 mm³, and in specific embodiments greater than 550 mm³, allowing further improvement of the aerosol. In some examples, the internal cavity includes a volume of between about 550 mm³ and about 750 mm³, for instance about 600 mm³ or 700 mm³.

The second hollow tubular element 8 can be configured to provide a temperature differential of at least 40 degrees Celsius between a heated volatilized component entering a first, upstream end of the second hollow tubular element 8 and a heated volatilized component exiting a second, downstream end of the second hollow tubular element 8. The second hollow tubular element 8 is in some embodiments configured to provide a temperature differential of at least 60 degrees Celsius, for example at least 80 degrees Celsius such as at least 100 degrees Celsius between a heated volatilized component entering a first, upstream end of the second hollow tubular element 8 and a heated volatilized component exiting a second, downstream end of the second hollow tubular element 8. This temperature differential across the length of the second hollow tubular element 8 protects the temperature sensitive body of material 6 from the high temperatures of the aerosol generating composition when it is heated.

In alternative articles, the second hollow tubular element 8 can be replaced with an alternative cooling element, for instance an element formed from a body of material which allows aerosol to pass through it longitudinally, and which also performs the function of cooling the aerosol.

In the present example, the first hollow tubular element 4, body of material 6 and second hollow tubular element 8 are combined using a second plug wrap 9 which is wrapped around all three sections. In some embodiments, the second plug wrap 9 has a basis weight of less than 50 gsm, such as between about 20 gsm and 45 gsm. In some embodiments, the second plug wrap 9 has a thickness of between 30 μm and 60 μm, such as between 35 μm and 45 μm. The second plug wrap 9 is for example a non-porous plug wrap having a permeability of less than 100 Coresta Units, for instance less than 50 Coresta Units. However, in alternative embodiments, the second plug wrap 9 can be a porous plug wrap, for instance having a permeability of greater than 200 Coresta Units.

In the present example, the aerosol generating material 3 is wrapped in a wrapper 10. The wrapper 10 can, for instance, be a paper or paper-backed foil wrapper. In the present example, the wrapper 10 is substantially impermeable to air. In alternative embodiments, the wrapper 10 for example has a permeability of less than 100 Coresta Units, such as less than 60 Coresta Units. It has been found that low permeability wrappers, for instance having a permeability of less than 100 Coresta Units, such as less than 60 Coresta Units, result in an improvement in the aerosol formation in the aerosol generating material 3. Without wishing to be bound by theory, it is hypothesized that this is due to reduced loss of aerosol compounds through the wrapper 10. The permeability of the wrapper 10 can be measured in accordance with ISO 2965:2009 concerning the determination of air permeability for materials used as cigarette papers, filter plug wrap and filter joining paper.

In the present embodiment, the wrapper 10 includes aluminum foil. Aluminum foil has been found to be particularly effective at enhancing the formation of aerosol within the aerosol generating material 3. In the present example, the aluminum foil has a metal layer having a thickness of about 6 μm. In the present example, the aluminum foil has a paper backing. However, in alternative arrangements, the aluminum foil can be other thicknesses, for instance between 4 μm and 16 μm in thickness. The aluminum foil also need not have a paper backing, but could have a backing formed from other materials, for instance to help provide an appropriate tensile strength to the foil, or it could have no backing material. Metallic layers or foils other than aluminum can also be used. The total thickness of the wrapper is for example between 20 μm and 60 μm, such as between 30 μm and 50 μm, which can provide a wrapper having appropriate structural integrity and heat transfer characteristics. The tensile force which can be applied to the wrapper before it breaks can be greater than 3,000 grams force, for instance between 3,000 and 10,000 grams force or between 3,000 and 4,500 grams force.

The article has a ventilation level of about 75% of the aerosol drawn through the article. In alternative embodiments, the article can have a ventilation level of between 50% and 80% of aerosol drawn through the article, for instance between 65% and 75%. Ventilation at these levels helps to slow down the flow of aerosol drawn through the mouthpiece 2 and thereby enable the aerosol to cool sufficiently before it reaches the downstream end 3b of the mouthpiece 2. The ventilation is provided directly into the mouthpiece 2 of the article 1. In the present example, the ventilation is provided into the second hollow tubular element 8, which has been found to be particularly beneficial in assisting with the aerosol generation process. The ventilation is provided via first and second parallel rows of perforations 12, in the present case formed as laser perforations, at positions 17.925 mm and 18.625 mm respectively from the downstream, mouth-end 3b of the mouthpiece 2. These perforations pass though the tipping paper 5, second plug wrap 9 and second hollow tubular element 8. In alternative embodiments, the ventilation can be provided into the mouthpiece at other locations, for instance into the body of material 6 or first tubular element 4.

Figure 2:
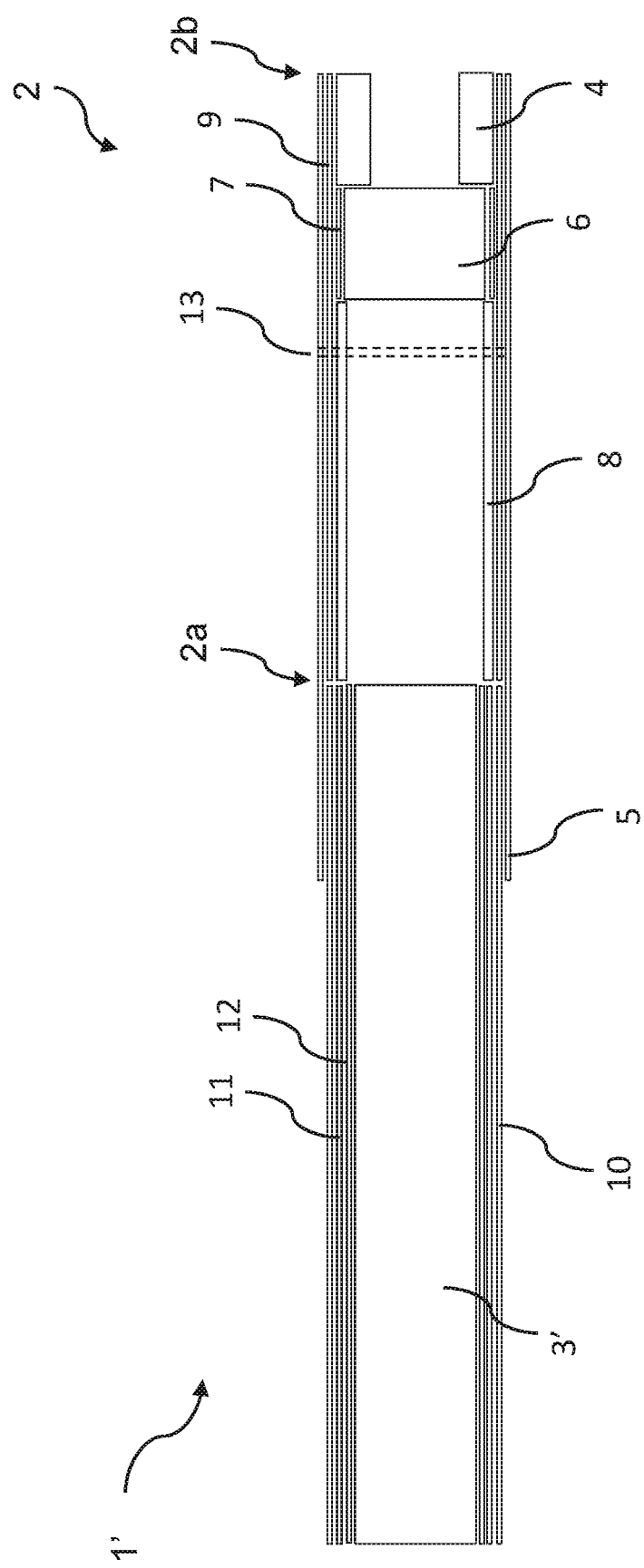
FIG. 2 is a side-on cross sectional view of a further article for use with a non-combustible aerosol provision device.

FIG. 2 is a side-on cross sectional view of a further article 1' including mouthpiece 2. Article 1' is substantially the same as article 1, except in this example the aerosol generating composition includes a sheet of first amorphous solid material 12 which circumscribes a rod of aerosol generating material 3', and a second amorphous solid material 11 which overlies the sheet of first amorphous solid material 12.

The inventors have advantageously found that providing both the first amorphous solid material and second amorphous solid material as wraps can result in an article including increased amounts of desirable components, such as an active substance or an aerosol former, compared to an article of the same volume in which one or both of the first and second amorphous solid materials is provided as a shredded sheet in the aerosol generating composition. For example, for a given volume of aerosol generating composition, providing the first and second amorphous solid materials as wraps can reduce the volume available for other aerosol generating materials by less than if the same mass of first or second amorphous solid material were provided as a shredded sheet and blended with the aerosol generating material. This can result in a higher overall delivery of desirable components of the aerosol for a given article size.

In this example, the rod of aerosol generating material 3' does not include amorphous solid material, although in other examples the aerosol generating composition may include a sheet of first amorphous solid material 11, and a sheet of second amorphous solid material 12, and shredded amorphous solid material in the rod of aerosol generating composition 3.

In some examples, the first amorphous solid material may be laminated on the second amorphous solid material.

In the present example, the first amorphous solid material 11 and the second amorphous solid material 12 have different compositions. In alternative embodiments, the first and second amorphous solid materials may have the same composition, material properties, and specification, or the first and second amorphous solid materials may differ in any of these parameters.

As described above, to provide an aerosol having a consistent flavor profile, it can be desirable for the amorphous solid material component of the aerosol-generating composition to be evenly distributed along the length of the component. In some examples, this can be achieved by including the first amorphous solid material 11 and second amorphous solid material 12 in sheet form as wraps, each wrap circumscribing the full length of the rod of aerosol generating composition 3'. In other examples, a sheet of first or second amorphous solid material 12, 11 may be arranged to extend only partially along a length of the rod of aerosol generating material 3'.

Figure 3A:
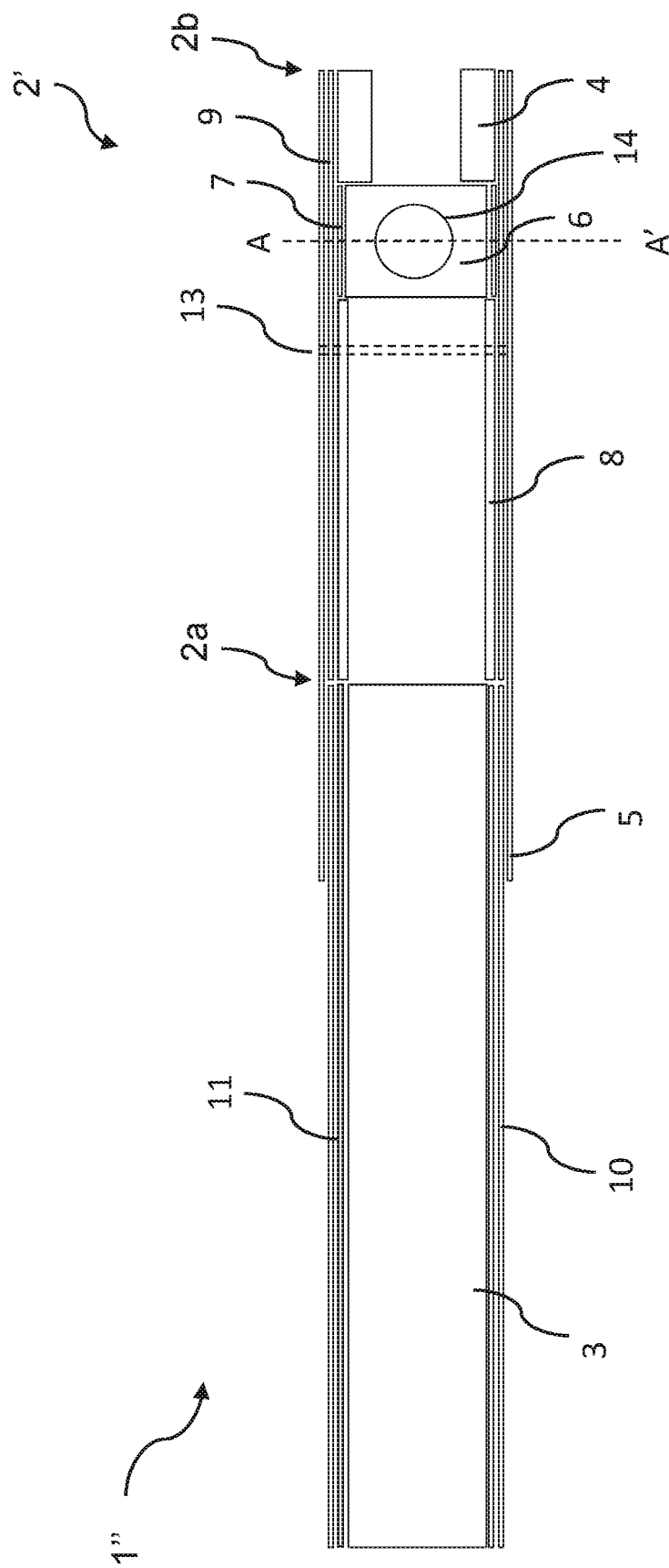
FIG. 3a is a side-on cross sectional view of an article for use with a non-combustible aerosol provision device, the article including a capsule containing mouthpiece.
Figure 3B:
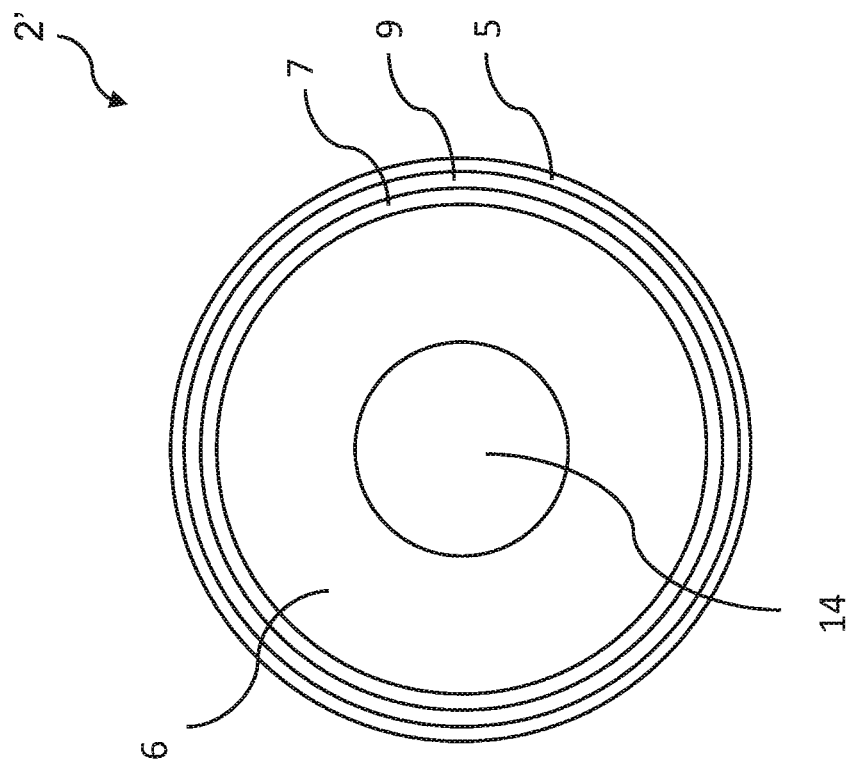

FIG. 3a is a side-on cross sectional view of a further article 1" including a capsule-containing mouthpiece 2'. FIG. 3b is a cross sectional view of the capsule-containing mouthpiece shown in FIG. 3a through the line A-A' thereof. Article 1" and capsule-containing mouthpiece 2' are the same as the article 1 and mouthpiece 2 illustrated in FIG. 1, except that an aerosol modifying agent is provided within the body of material 6, in the present example in the form of a capsule 14, and that an oil-resistant first plug wrap 7' surrounds the body of material 6. In other examples, the aerosol modifying agent can be provided in other forms, such as material injected into the body of material 6 or provided on a thread, for instance the thread carrying a flavorant or other aerosol modifying agent, which may also be disposed within the body of material 6.

In some examples, the first amorphous solid material is provided in the rod of aerosol generating material 3, and the capsule 14 includes the second amorphous solid material. For instance, the capsule shell and or core can include an amorphous solid material.

The capsule 14 can include a breakable capsule, for instance a capsule which has a solid, frangible shell surrounding a liquid payload. In the present example, a single capsule 14 is used. The capsule 14 is entirely embedded within the body of material 6. In other words, the capsule 14 is completely surrounded by the material forming the body 6. In other examples, a plurality of breakable capsules may be disposed within the body of material 6, for instance 2, 3 or more breakable capsules. The length of the body of material 6 can be increased to accommodate the number of capsules required. In examples where a plurality of capsules is used, the individual capsules may be the same as each other, or may differ from one another in terms of size and/or capsule payload. In other examples, multiple bodies of material 6 may be provided, with each body containing one or more capsules.

The capsule 14 has a core-shell structure. In other words, the capsule 14 includes a shell encapsulating a liquid agent, for instance a flavorant or other agent, which can be any one of the flavorants or aerosol modifying agents described herein. The shell of the capsule can be ruptured by a user to release the flavorant or other agent into the body of material 6. The first plug wrap 7' can include a barrier coating to make the material of the plug wrap substantially impermeable to the liquid payload of the capsule 14. Alternatively or in addition, the second plug wrap 9 and/or tipping paper 5 can include a barrier coating to make the material of that plug wrap and/or tipping paper substantially impermeable to the liquid payload of the capsule 14.

In the present example, the capsule 14 is spherical and has a diameter of about 3 mm. In other examples, other shapes and sizes of capsule can be used. The total weight of the capsule 14 may be in the range about 10 mg to about 50 mg.

In the present example, the capsule 14 is located at a longitudinally central position within the body of material 6. That is, the capsule 14 is positioned so that its center is 4 mm from each end of the body of material 6. In other examples, the capsule 14 can be located at a position other than a longitudinally central position in the body of material 6, i.e. closer to the downstream end of the body of material 6 than the upstream end, or closer to the upstream end of the body of material 6 than the downstream end. In some embodiments, the mouthpiece 2' is configured so that the capsule 14 and the ventilation holes 13 are longitudinally offset from each other in the mouthpiece 2'.

A cross section of the mouthpiece 2' is shown in FIG. 3b, this being taken through line A-A' of FIG. 3a. FIG. 3b shows the capsule 14, the body of material 6, the first and second plug wraps 7', 9 and the tipping paper 5. In the present example, the capsule 14 is centered on the longitudinal axis (not shown) of the mouthpiece 2'. The first and second plug wraps 7', 9 and tipping 5 are arranged concentrically around the body of material 6.

The breakable capsule 14 has a core-shell structure. That is, the encapsulating material or barrier material creates a shell around a core that includes the aerosol modifying agent. The shell structure hinders migration of the aerosol modifying agent during storage of the article 1" but allows controlled release of the aerosol modifying agent, also referred to as an aerosol modifier, during use.

In some cases, the barrier material (also referred to herein as the encapsulating material) is frangible. The capsule is crushed or otherwise fractured or broken by the user to release the encapsulated aerosol modifier. Typically, the capsule is broken immediately prior to heating being initiated but the user can select when to release the aerosol modifier. The term "breakable capsule" refers to a capsule, wherein the shell can be broken by means of a pressure to release the core; more specifically the shell can be ruptured under the pressure imposed by the user's fingers when the user wants to release the core of the capsule.

In some cases, the barrier material is heat resistant. That is to say, in some cases, the barrier will not rupture, melt or otherwise fail at the temperature reached at the capsule site during operation of the aerosol provision device. Illustratively, a capsule located in a mouthpiece may be exposed to temperatures in the range of 30° C. to 100° C. for example, and the barrier material may continue to retain the liquid core up to at least about 50° C. to 120° C.

In other cases, the capsule releases the core composition on heating, for example by melting of the barrier material or by capsule swelling leading to rupture of the barrier material.

The total weight of a capsule may be in the range of about 1 mg to about 100 mg, suitably about 5 mg to about 60 mg, about 8 mg to about 50 mg, about 10 mg to about 20 mg, or about 12 mg to about 18 mg.

The total weight of the core formulation may be in the range of about 2 mg to about 90 mg, suitably about 3 mg to about 70 mg, about 5 mg to about 25 mg, about 8 mg to about 20 mg, or about 10 mg to about 15 mg.

The capsule according to the disclosure includes a core as described above, and a shell. The capsules may present a crush strength from about 4.5 N to about 40 N, such as from about 5 N to about 30 N or to about 28 N (for instance about 9.8 N to about 24.5 N). The capsule burst strength can be measured when the capsule is removed from the body of material 6 and using a force gauge to measure the force at which the capsule bursts when pressed between two flat metal plates. A suitable measurement device is the Sauter FK 50 force gauge with a flat headed attachment, which can be used to crush the capsule against a flat, hard surface having a surface similar to the attachment.

The capsules may be substantially spherical and have a diameter of at least about 0.4 mm, 0.6 mm, 0.8 mm, 1.0 mm, 2.0 mm, 2.5 mm, 2.8 mm or 3.0 mm. The diameter of the capsules may be less than about 10.0 mm, 8.0 mm, 7.0 mm, 6.0 mm, 5.5 mm, 5.0 mm, 4.5 mm, 4.0 mm, 3.5 mm or 3.2 mm. Illustratively, the capsule diameter may be in the range of about 0.4 mm to about 10.0 mm, about 0.8 mm to about 6.0 mm, about 2.5 mm to about 5.5 mm or about 2.8 mm to about 3.2 mm. In some cases, the capsule may have a diameter of about 3.0 mm. These sizes are particularly suitable for incorporation of the capsule into an article as described herein.

The cross-sectional area of the capsule 14 at its largest cross sectional area is in some embodiments less than 28% of the cross sectional area of the portion of the mouthpiece 2' in which the capsule 14 is provided, such as less than 27% and in specific embodiments less than 25%. For instance, for the spherical capsule having a diameter of 3.0 mm, the largest cross sectional area of the capsule is 7.07 mm$^2$. For the mouthpiece 2' having a circumference of 21 mm as described herein, the body of material 6 has an outer circumference of 20.8 mm, and the radius of this component will be 3.31 mm, corresponding to a cross sectional area of 34.43 mm$^2$. The capsule cross sectional area is, in this example, 20.5% of the cross-sectional area of the mouthpiece 2'. As another example, if the capsule had a diameter of 3.2 mm, its largest cross sectional area would be 8.04 mm$^2$. In this case, the cross sectional area of the capsule would be 23.4% of the cross sectional area of the body of material 6. A capsule with a largest cross sectional area less than 28% of the cross sectional area of the portion of the mouthpiece 2' in which the capsule 14 is provided has the advantage that the pressure drop across the mouthpiece 2' is reduced as compared to capsules with larger cross sectional areas and adequate space remains around the capsule for aerosol to pass without the body of material 6 removing significant amounts of the aerosol mass as it passes through the mouthpiece 2'.

In some embodiments the pressure drop or difference (also referred to a resistance to draw) across the article, measured as the open pressure drop (i.e. with the ventilation openings open), reduces by less than 8 mmH2O when the capsule is broken. In further embodiments, the open pressure drop reduces by less than 6 mmH2O such as less than 5 mmH2O. These values are measured as the average achieved by at least 80 articles made to the same design. Such small changes in pressure drop mean that other aspects of the product design, such as setting the correct ventilation level for a given product pressure drop, can be achieved irrespective of whether or not the consumer chooses to break the capsule.

The barrier material may include one or more of a gelling agent, a bulking agent, a buffer, a coloring agent and a plasticizer. The barrier material may include an amorphous solid material.

Suitably, the gelling agent of the capsule may be, for example, a polysaccharide or cellulosic gelling agent, a gelatin, a gum, a gel, a wax or a mixture thereof. Suitable polysaccharides include alginates, dextrans, maltodextrins, cyclodextrins and pectins. Suitable alginates include, for instance, a salt of alginic acid, an esterified alginate or glyceryl alginate. Salts of alginic acid include ammonium alginate, triethanolamine alginate, and group I or II metal ion alginates like sodium, potassium, calcium and magnesium alginate. Esterified alginates include propylene glycol alginate and glyceryl alginate. In an embodiment, the barrier material is sodium alginate and/or calcium alginate. Suitable cellulosic materials include methyl cellulose, ethyl cellulose, hydroxyethyl cellulose, hydroxypropyl cellulose, carboxymethyl cellulose, cellulose acetate and cellulose ethers. The gelling agent may include one or more modified starches. The gelling agent may include carrageenans. Suitable gums include agar, gellan gum, gum Arabic, pullulan gum, mannan gum, gum ghatti, gum tragacanth, Karaya, locust bean, acacia gum, guar, quince seed and xanthan gums. Suitable gels include agar, agarose, carrageenans, furoidan and furcellaran. Suitable waxes include carnauba wax. In some cases, the gelling agent may include carrageenans and/or gellan gum; these gelling agents are particularly suitable for inclusion as the gelling agent as the pressure required to break the resulting capsules is particularly suitable.

The barrier material may include one or more bulking agents, such as starches, modified starches (such as oxidized starches) and sugar alcohols such as maltitol.

The barrier material may include a coloring agent which renders easier the location of the capsule within the aerosol generating device during the manufacturing process of the aerosol generating device. The coloring agent is in some embodiments chosen among colorants and pigments.

The barrier material may further include at least one buffer, such as a citrate or phosphate compound.

The barrier material may further include at least one plasticizer, which may be glycerol, sorbitol, maltitol, triacetin, polyethylene glycol, propylene glycol or another polyalcohol with plasticizing properties, and optionally one acid of the monoacid, diacid or triacid type, especially citric acid, fumaric acid, malic acid, and the like. The amount of plasticizer ranges from 1% to 30% by weight, for example from 2% to 15% by weight, and in specific embodiments from 3 to 10% by weight of the total dry weight of the shell. The barrier material may also include one or more filler materials. Suitable filler materials include including starch derivatives such as dextrin, maltodextrin, cyclodextrin (alpha, beta or gamma), or cellulose derivatives such as hydroxypropyl-methylcellulose (HPMC), hydroxypropylcellulose (HPC), methylcellulose (MC), carboxy-methylcellulose (CMC), polyvinyl alcohol, polyols or mixture thereof. Dextrin is a preferred filler. The amount of filler in the shell is at most 98.5%, in some embodiments from 25 to 95% and in further embodiments from 40 to 80% and in specific embodiments from 50 to 60% by weight on the total dry weight of the shell.

The capsule shell may additionally include a hydrophobic outer layer which reduces the susceptibility of the capsule to moisture-induced degradation. The hydrophobic outer layer is suitably selected from the group including waxes, especially carnauba wax, candelilla wax or beeswax, carbowax, shellac (in alcoholic or aqueous solution), ethyl cellulose, hydroxypropyl methyl cellulose, hydroxyl-propylcellulose, latex composition, polyvinyl alcohol, or a combination thereof. In further embodiments, the at least one moisture barrier agent is ethyl cellulose or a mixture of ethyl cellulose and shellac.

The capsule core includes the aerosol modifier. This aerosol modifier may be any volatile substance which modifies at least one property of the aerosol. For example, the aerosol substance may modify the pH, the sensorial properties, the water content, the delivery characteristics or the flavor. In some cases, the aerosol modifier may be selected from an acid, a base, water or a flavorant. In some embodiments, the aerosol modifier includes one or more flavorants.

The flavorant may suitably be licorice, rose oil, vanilla, lemon oil, orange oil, a mint-flavor, suitably menthol and/or a mint oil from any species of the genus Mentha such as peppermint oil and/or spearmint oil, or lavender, fennel or anise.

In some cases, the flavorant includes menthol.

In some cases, the capsule may include at least about 25% w/w flavorant (based on the total weight of the capsule), suitably at least about 30% w/w flavorant, 35% w/w flavorant, 40% w/w flavorant, 45% w/w flavorant or 50% w/w flavorant.

In some cases, the core may include at least about 25% w/w flavorant (based on the total weight of the core), suitably at least about 30% w/w flavorant, 35% w/w flavorant, 40% w/w flavorant, 45% w/w flavorant or 50% w/w flavorant. In some cases, the core may include less than or equal to about 75% w/w flavorant (based on the total weight of the core), suitably less than or equal to about 65% w/w flavorant, 55% w/w flavorant, or 50% w/w flavorant. Illustratively, the capsule may include an amount of flavorant in the range of 25-75% w/w (based on the total weight of the core), about 35-60% w/w or about 40-55% w/w.

The capsules may include at least about 2 mg, 3 mg or 4 mg of the aerosol modifier, suitably at least about 4.5 mg of the aerosol modifier, 5 mg of the aerosol modifier, 5.5 mg of the aerosol modifier or 6 mg of the aerosol modifier.

In some cases, the consumable includes at least about 7 mg of the aerosol modifier, suitably at least about 8 mg of the aerosol modifier, 10 mg of the aerosol modifier, 12 mg of the aerosol modifier or 15 mg of the aerosol modifier. The core may also include a solvent which dissolves the aerosol modifier.

Any suitable solvent may be used.

Where the aerosol modifier includes a flavorant, the solvent may suitably include short or medium chain fats and oils. For example, the solvent may include tri-esters of glycerol such as C2-C12 triglycerides, suitably C6-C10 triglycerides or Cs-C12 triglycerides. For example, the solvent may include medium chain triglycerides (MCT—C8-C12), which may be derived from palm oil and/or coconut oil.

The esters may be formed with caprylic acid and/or capric acid. For example, the solvent may include medium chain triglycerides which are caprylic triglycerides and/or capric tryglycerides. For example, the solvent may include compounds identified in the CAS registry by numbers 73398-61-5, 65381-09-1, 85409-09-2. Such medium chain triglycerides are odorless and tasteless.

The hydrophilic-lipophilic balance (HLB) of the solvent may be in the range of 9 to 13, suitably 10 to 12. Methods of making the capsules include co-extrusion, optionally followed by centrifugation and curing and/or drying. The contents of WO 2007/010407 A2 is incorporated by reference, in its entirety.

In some examples, the article includes aerosol generating material including tobacco material and the first amorphous solid material, and a capsule in the mouthpiece including the second amorphous solid material. In such examples, the first amorphous solid material, the tobacco material and the capsule may advantageously include a flavorant, and aerosol-former material, or both of a flavorant and an aerosol former material. For example, a flavorant such as menthol may be applied to the tobacco material, and further flavorant may be provided in the first amorphous solid material. This combination can provide a desirable sensory experience for the user over the period of use of the article. For instance, the flavorant on the tobacco material may be readily volatilized and provide a first phase of the sensory experience soon after the user begins to use the article. The flavorant included in the first amorphous solid material may provide a sustained release of flavor over the period of use of the article, providing a second phase of the sensory experience for the user. Further flavorant may also be provided in a capsule including the second amorphous solid material, and can provide an optional additional flavor to the article in use, providing a third phase of the sensory experience for the user.

In other examples, the first amorphous solid material, the tobacco material and the capsule may each include an aerosol-former material.

In the examples described above, the mouthpieces 2, 2' each include a single body of material 6. In other examples, either the mouthpiece of FIG. 1 or of FIGS. 3a and 3b may include multiple bodies of material. The mouthpieces 2, 2' may include a cavity between the bodies of material.

In some examples, the mouthpiece 2, 2' downstream of the aerosol generating composition 3 can include a wrapper, for instance the first or second plug wraps 7, 9, or tipping paper 5, which includes an aerosol modifying agent as described herein or other sensate material. The aerosol modifying agent may be disposed on an inwardly or outwardly facing surface of the mouthpiece wrapper. For instance, the aerosol modifying agent or other sensate material may be provided on an area of the wrapper, such as an outwardly facing surface of the tipping paper 5, which comes into contact with the consumer's lips during use. By disposing the aerosol modifying agent or other sensate material on the outwardly facing surface of the mouthpiece wrapper, the aerosol modifying agent or other sensate material may be transferred to the consumer's lips during use. Transfer of the aerosol modifying agent or other sensate material to the consumer's lips during use of the article may modify the organoleptic properties (e.g. taste) of the aerosol generated by the aerosol generating composition 3 or otherwise provide the consumer with an alternative sensory experience. For example, the aerosol modifying agent or other sensate material may impart flavor to the aerosol generated by the aerosol generating composition 3. The aerosol modifying agent or other sensate material may be at least partially soluble in water such that it is transferred to the user via the consumer's saliva. The aerosol modifying agent or other sensate material may be one that volatilizes by the heat generated by the aerosol provision system. This may facilitate transfer of the aerosol modifying agent to the aerosol generated by the aerosol generating composition 3. A suitable sensate material may be a flavor as described herein, sucralose or a cooling agent such as menthol or similar.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the disclosure may suitably include, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. An article for use in a non-combustible aerosol provision system, a portion of the article comprising a first amorphous solid material and a second amorphous solid material, wherein one of the first or second amorphous solid materials comprises an aerosol former in a higher amount by % weight than the other of the first or second amorphous solid material, wherein the first and second amorphous solid materials of the portion comprise an aerosol-generating composition, and wherein second amorphous solid material comprises a plurality of strands or strips, wherein the strands or strips of the second amorphous solid material are distributed within the portion and wherein the second amorphous solid comprises a gelling agent.

2. The article according to claim 1, wherein the aerosol-generating composition comprises tobacco material.

3. The article according to claim 1, wherein the first amorphous solid material comprises a first wrapping material circumscribing the portion.

4. The article according to claim 1, wherein the first amorphous solid material is provided in sheet form.

5. The article according to claim 1, wherein the first amorphous solid material comprises a plurality of strands or strips, optionally wherein the strands or strips of the first amorphous solid material are distributed within the portion.

6. The article according to claim 3, wherein the second amorphous solid material is in sheet form, wherein the sheet of second amorphous material comprises a second wrapping material, said second wrapping material overlying at least a portion of the first wrapping material.

7. The article according to claim 1, wherein the portion is circumscribed by a cellulose based wrapping material.

8. The article according to claim 1, wherein at least one of the first amorphous solid material and the second amorphous solid material comprises an active substance.

9. The article according to claim 8, wherein the active substance comprises a flavorant.

10. The article according to claim 9, wherein the flavorant comprises menthol.

11. The article according to claim 1, wherein at least one of the first or second amorphous material comprises an aerosol-former in an amount from 40% to 80% by weight, or in an amount from 12% to 20% by weight.

12. The article according to claim 11, wherein the aerosol-former comprises glycerol.

13. The article according to claim 1, wherein at least one of the first or second amorphous solid is laminated on a support.

14. The article according to claim 13, wherein the support comprises at least one selected from aluminium foil and paper.

15. The article according to claim 1, wherein one of the first or second amorphous solid materials is laminated on the other of the first or second amorphous solid materials.

16. The article according to claim 1, wherein one of the first or second amorphous solid materials comprises a flavorant in an amount from 30% to 60% by weight, and the other of the first or second amorphous solid materials comprises an aerosol-former in an amount from about 40% to 80% by weight.

17. The article according to claim 1, wherein one of the first or second amorphous solid materials comprises flavorant in an amount greater than 30% by weight, and the other of the first or second amorphous solid materials comprises less than 20% flavorant by weight.

18. The article according to claim 1, wherein the thickness of the second amorphous solid material is greater than the thickness of the first amorphous solid material.

19. The article according to claim 1, wherein the thickness of the first amorphous solid material is greater than the thickness of the second amorphous solid material.

20. The article according to claim 1, wherein the density of the second amorphous solid material is greater than the density of the first amorphous solid material.

21. The article according to claim 1, wherein the density of the first amorphous solid material is greater than the density of the second amorphous solid material.

22. The article according to claim 1, wherein at least one of the first or second amorphous solid materials comprises a filler material.

23. A non-combustible aerosol provision system, comprising an aerosol provision device and the article according to claim 1.

* * * * *